US009384060B2

(12) United States Patent
Hunter et al.

(10) Patent No.: US 9,384,060 B2
(45) Date of Patent: Jul. 5, 2016

(54) DYNAMIC ALLOCATION AND ASSIGNMENT OF VIRTUAL FUNCTIONS WITHIN FABRIC

(71) Applicants: James R Hunter, Malvern, PA (US); Sung V Huynh, Malvern, PA (US); Edward T Cavanagh, Malvern, PA (US); John A Landis, Malvern, PA (US)

(72) Inventors: James R Hunter, Malvern, PA (US); Sung V Huynh, Malvern, PA (US); Edward T Cavanagh, Malvern, PA (US); John A Landis, Malvern, PA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 14/487,192

(22) Filed: Sep. 16, 2014

(65) Prior Publication Data

US 2016/0077884 A1    Mar. 17, 2016

(51) Int. Cl.
*G06F 9/46*     (2006.01)
*G06F 9/50*     (2006.01)
*G06F 9/455*    (2006.01)
*G06F 9/44*     (2006.01)

(52) U.S. Cl.
CPC ............ *G06F 9/5077* (2013.01); *G06F 9/4411* (2013.01); *G06F 9/45545* (2013.01); *G06F 9/45558* (2013.01); *G06F 2009/45579* (2013.01)

(58) Field of Classification Search
None
See application file for complete search history.

(56) References Cited

U.S. PATENT DOCUMENTS

| 7,984,104 | B1 | 7/2011 | Stark et al. |
| 2012/0131232 | A1* | 5/2012 | Brownlow ............... G06F 3/00 710/10 |
| 2013/0159686 | A1* | 6/2013 | Graham ............... G06F 9/5077 713/1 |
| 2014/0143372 | A1* | 5/2014 | Nahrgang ............... G06F 9/546 709/215 |
| 2014/0358972 | A1 | 12/2014 | Guarrieri et al. |

* cited by examiner

*Primary Examiner* — H S Sough
*Assistant Examiner* — Carina Yun
(74) *Attorney, Agent, or Firm* — Richard J. Gregson

(57) ABSTRACT

Methods and systems for allocating, one or more virtual functions of a plurality of virtual functions associated with physical functions of I/O interface devices of a computing device are described. One method includes managing one or more physical functions of an I/O interface device within an interconnect partition of a multi-partition virtualization system implemented at least in part on the computing device. The method further includes, during a boot process of a second partition on the computing device, parsing a file to determine an assignment of one or more virtual functions to the second partition and associate each of the one or more virtual functions to corresponding physical functions.

24 Claims, 12 Drawing Sheets

DYNAMIC ALLOCATION AND ASSIGNMENT OF VIRTUAL FUNCTIONS WITHIN FABRIC

TECHNICAL FIELD

The present application relates generally to virtualization systems, and in particular to single-root input/output virtualization in a distributed multi-partition virtualization system.

BACKGROUND

Computer system virtualization allows multiple operating systems and processes to share the hardware resources of a host computer. Ideally, the system virtualization provides resource isolation so that each operating system does not realize that it is sharing resources with another operating system and does not adversely affect the execution of the other operating system. Such system virtualization enables applications including server consolidation, co-located hosting facilities, distributed web services, applications mobility, secure computing platforms, and other applications that provide for efficient use of underlying hardware resources.

Existing virtualization systems, such as those provided by VMWare and Microsoft, have developed relatively sophisticated virtualization systems that are architected as a monolithic virtualization software system that hosts each virtualized system. In other words, these virtualization systems are constructed to host each of the virtualized systems on a particular computing platform. As such, the virtualization systems or virtual machine monitors (VMMs) associate hardware resources of a particular platform with each partition. Typically, this involves sharing of resources across multiple partitions. For example, two partitions may share a same processor and memory resource (although may be separated by address ranges or otherwise maintained to ensure isolated memory management). Furthermore, two such partitions may also share input/output devices, such as keyboards, mice, printing ports, Ethernet ports, or other communications interfaces.

Recently, technologies have been introduced that simplify sharing of I/O devices in a computing system across a plurality of virtual machines. Such technologies include Single-Root Input/Output Virtualization (SR-IOV), which allows a single physical device to be made available to multiple separate virtual devices without requiring the virtualization system to manage time-sharing of the device across such virtual machines that wish to share the I/O device. In particular, SR-IOV is intended to standardize a way of bypassing a VMM's involvement in data movement by providing independent memory space, interrupts, and DMA streams for each virtual machine. SR-IOV architecture is designed to allow a device to support multiple Virtual Functions (VFs) while minimizing the hardware cost of each additional function.

SR-IOV-compatible devices are defined by two primary function types—physical functions (PFs) and virtual functions (VFs). Physical functions are full PCIe functions that include the SR-IOV Extended Capability, which is used to configure and manage the SR-IOV functionality. Virtual functions are 'lightweight' PCIe functions that contain the resources necessary for data movement but have a carefully minimized set of configuration resources. Each virtual function is associated with a physical function, and relies on the physical function for execution.

Because existing SR-IOV technologies are managed entirely by the VMM associated with a particular virtualization architecture, such I/O devices are dependent upon continued operation of the VMM for continued proper operation of the I/O device. Additionally, by managing the SR-IOV instance, and in particular the physical function, the VMM is required to directly manage I/O functionality, rather than allowing an operating system or some other system specialized to that task. Additionally, because such VMMs are typically a monolithic software system, in case of failure of such a VMM, the entire I/O device will become unusable.

For these and other reasons, improvements are desirable.

SUMMARY

In summary, the present disclosure relates to virtualization systems, and in particular to methods and systems for managing I/O devices in such virtualization systems. In example aspects of the present disclosure, management of single-root I/O virtualization systems is provided in a distributed multi-partition virtualization system In a first aspect, a method for allocating one or more virtual functions of a plurality of virtual functions associated with physical functions of I/O interface devices of a computing device are described. One method includes managing one or more physical functions of an I/O interface device within an interconnect partition of a multi-partition virtualization system implemented at least in part on the computing device. The method further includes, during a boot process of a second partition on the computing device, parsing a file to determine an assignment of one or more virtual functions to the second partition and associate each of the one or more virtual functions to corresponding physical functions.

In a second aspect, a method of allocating I/O functions to partitions included within a multi-partition virtualization system implemented at least in part on the computing device is disclosed. The method includes, during boot time of a partition, allocating base address registers for each of a plurality of virtual functions associated with the partition. The method also includes, during boot time of the partition, parsing a file defining a configuration of a virtual function and an association to a physical function. The virtual function is associated with the physical function and in an active state prior to boot into an operating system within the partition.

In a third aspect, a virtualization system including a plurality of partitions provided on a computing device including at least one I/O device having one or more physical functions is disclosed. The virtualization system includes an interconnect service partition including a single root PCI manager, the single-root PCI manager including a plurality of physical function device drivers corresponding to physical functions of I/O devices of the computing device. The virtualization system further includes one or more guest partitions, the guest partitions each including an operating system into which the partition boots, and a file defining one or more virtual functions associated with each of the physical functions, and associating a virtual function from among the one or more virtual functions with a guest partition from among the one or more guest partitions. During boot of a guest partition from among the one or more guest partitions, a boot process reads the file to associate at least one virtual function with the pest partition and to activate the at least one virtual function prior to completion of the boot process.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

Figure 1:
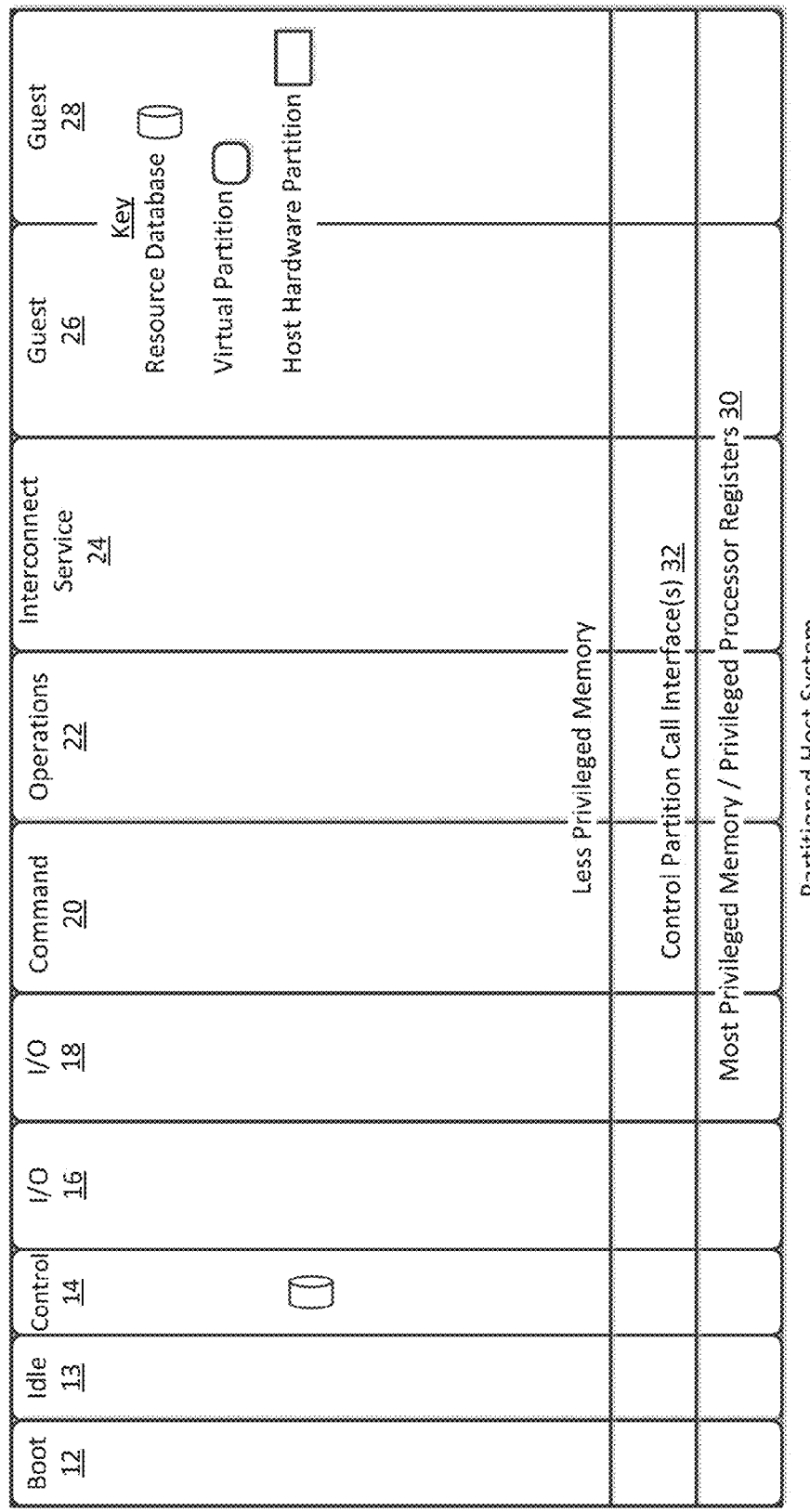
FIG. 1 illustrates system infrastructure partitions in an exemplary embodiment of a host system partitioned using the para-virtualization system of the present disclosure.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments of the disclosure described herein are implemented as: (1) a sequence of computer implemented steps, operations, or procedures naming on a programmable circuit within a computer, and/or (2) a sequence of computer implemented steps, operations, or procedures running on a programmable circuit within a directory system, database, or compiler.

As briefly described above, embodiments of the present disclosure are directed to methods and systems for managing input/output (I/O) devices in a multi-partition virtualized system, and in particular managing such devices using systems provided within the partitions themselves, thereby accounting for failures of either the I/O devices themselves or the partitions in which they reside.

According to example embodiments discussed herein, a single root I/O manager (SR-IOM) can be managed within a partition itself, rather than within a virtual machine monitor (VMM), thereby allowing the SR-IOM to be reset as needed, and to preserve the physical function and instance of the SR-IOM through failures of a particular VMM. The methods and systems discussed herein provide for management of physical functions and virtual functions, while providing a mechanism allowing the virtual machine (rather than the virtualization software itself, or VMM) to have access to privileged memory at the hardware level that is used for SR-IOV mappings.

In the context of the present disclosure, virtualization software generally corresponds to software that executes natively on a computing system, through which non-native software can be executed by hosting that software. In such cases, the virtualization software exposes those native resources in a way that is recognizable to the non-native software. By way of reference, non-native software, otherwise referred to herein as "virtualized software" or a "virtualized system", refers to software not natively executed on a particular hardware system, for example due to it being written liar execution by a different type of microprocessor configured to execute a different native instruction set. In some of the examples discussed herein, the native software set can be the x86-32, x86-64, or IA64 instruction set from Intel Corporation of Sunnyvale, Calif., while the non-native or virtualized system might be compiled for execution on an OS2200 system from Unisys Corporation of Blue Bell, Pa. However, it is understood that the principles of the present disclosure are not thereby limited; rather, non-native software simply can correspond to software not hosted or executed directly on hardware resources in the absence of a monitor system used to manage such execution, and to provide an abstraction layer between the application or workload to be executed, and, the underlying hardware resources.

I. Para-Virtualization System Architecture

Referring to FIG. 1, an example arrangement of a para-virtualization system is shown that can be used in implementing the SR-IOV-based the features mentioned above. In some embodiments, the architecture discussed herein uses the principle of least privilege to run code at the lowest practical privilege. To do this, special infrastructure partitions run resource management and physical I/O device drivers. FIG. 1 illustrates system infrastructure partitions on the left and user guest partitions on the right. Host hardware resource management runs as a control application in a special control partition. This control application implements a server for a command channel to accept transactional requests for assignment of resources to partitions. The control application maintains the master in-memory database of the hardware resource allocations. The control application also provides a read only view of individual partitions to the associated partition monitors.

In FIG. 1, partitioned host (hardware) system (or node), shown as host computing system 10, has lesser privileged memory that is divided into distinct partitions including special infrastructure partitions such as boot partition 12, idle partition 13, control partition 14, first and second I/O partitions 16 and 18, command partition 20, operations partition 22, and interconnect service partition 24, as well as virtual guest partitions 26 and 28. As illustrated, the partitions 12-28 do not directly access the underlying privileged memory and processor registers 30 but instead accesses the privileged memory and processor registers 30 via a hypervisor system call interface 32 that provides context switches amongst the partitions 12-28 in a conventional fashion. Unlike conventional VMMs and hypervisors, however, the resource management functions of the partitioned host computing system 10 of FIG. 1 are implemented in the special infrastructure partitions 12-22. Furthermore, rather than requiring re-write of portions of the guest operating system, drivers can be provided in the guest operating system environments that can execute system calls. As explained in further detail in U.S. Pat. No. 7,984,104, assigned to Unisys Corporation of Blue Bell, Pa., these special infrastructure partitions 12-24 control resource management and physical I/O device drivers that are, in turn, used by operating systems operating as guests in the guest partitions 26-28. Of course, many other guest partitions may be implemented in a particular host computing system 10 partitioned in accordance with the techniques of the present disclosure.

A boot partition 12 contains the host boot firmware and functions to initially load the control, I/O and command partitions (elements 14-20). Once launched, the resource management "control" partition 14 includes minimal firmware that tracks resource usage using a tracking application referred to herein as a control or resource management application. Host resource management decisions are performed in command partition 20 and distributed decisions amongst partitions in one or more host computing systems 10 are managed by operations partition 22. I/O to disk drives and the like is controlled by one or both of I/O partitions 16 and 18 so as to provide both failover and load balancing capabilities. Operating systems in the guest partitions 24, 26, and 28 communicate with the I/O partitions 16 and 18 via memory channels (FIG. 3) established by the control partition 14. The partitions communicate only via the memory channels. Hardware I/O resources are allocated only to the I/O partitions 16, 18. In the configuration of FIG. 1, the hypervisor system call interface 32 is essentially reduced to context switching and containment elements (monitors) for the respective partitions.

Figure 2:
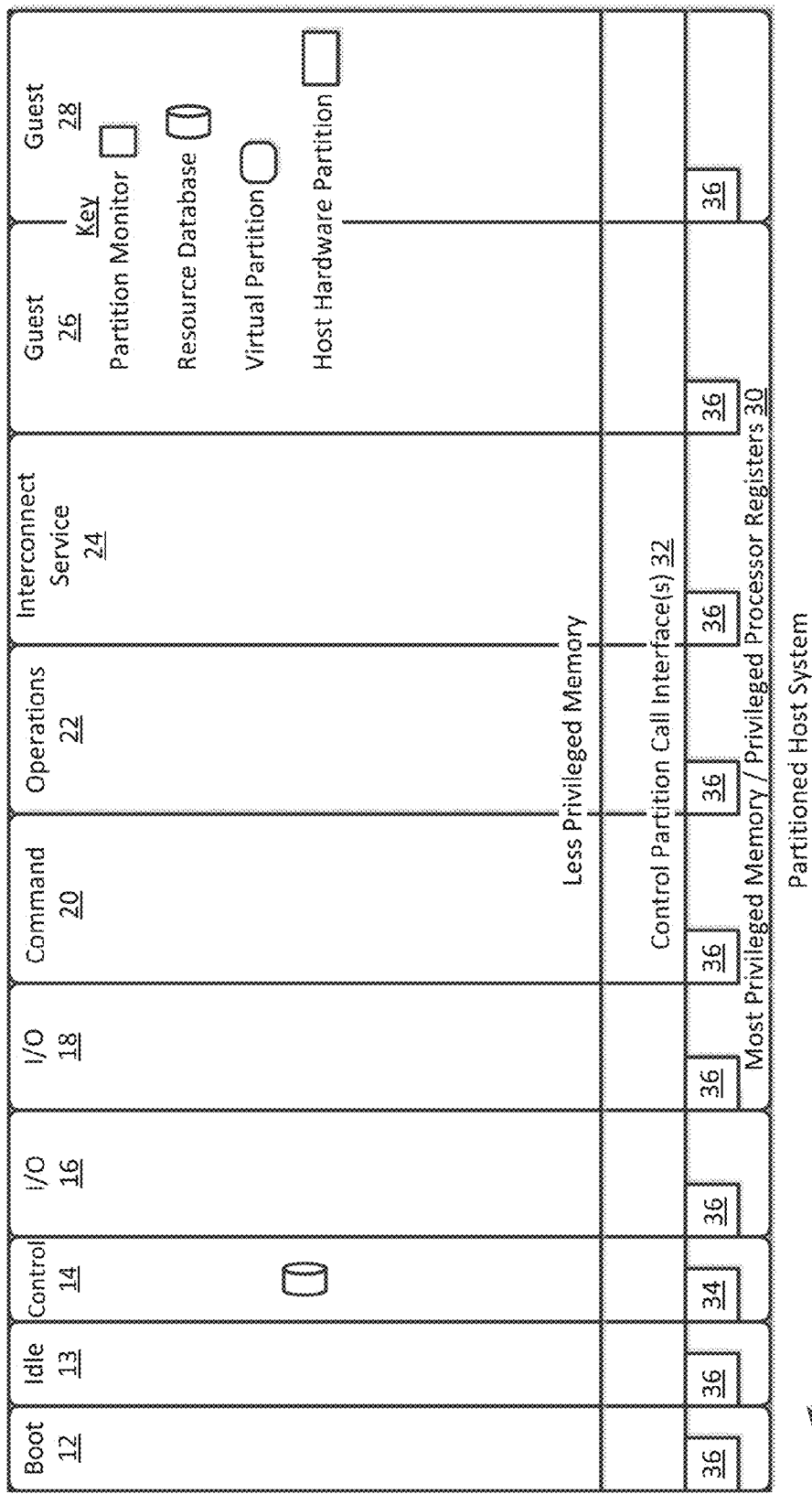
FIG. 2 illustrates the partitioned host of FIG. 1 and the associated partition monitors of each partition.
Figure 3:
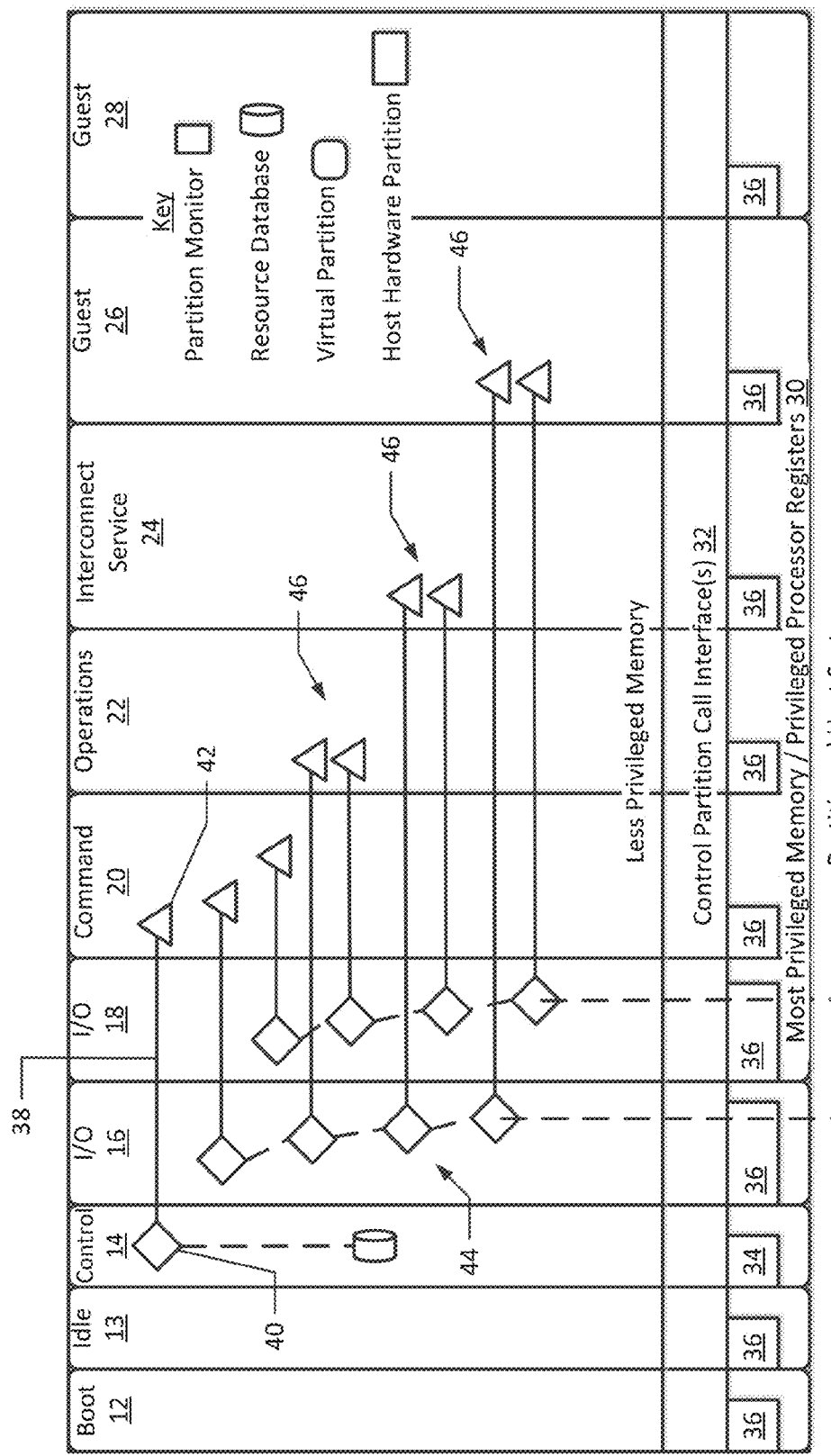
FIG. 3 illustrates memory mapped communication channels amongst various partitions of the para-virtualization system of FIG. 1.

The resource manager application of the control partition 14, shown as application 40 in FIG. 3, manages a resource database 33 that keeps track of assignment of resources to partitions and further serves a command channel 38 to accept transactional requests for assignment of the resources to respective partitions. As illustrated in FIG. 2, control partition 14 also includes a partition (lead) monitor 34 that is similar to a virtual machine monitor (VMM) except that it provides individual read-only views of the resource database in the control partition 14 to associated partition monitors 36 of each partition. Thus, unlike conventional VMMs, each partition has its own monitor 36 per vCPU of the partition such that failure of the monitor 36 does not bring down the entire host computing system 10. As will be explained below, the guest operating systems in the respective partitions 26, 28 (referred to herein as "guest partitions") are modified to access the associated partition monitors 36 that implement together with hypervisor system call interface 32 a communications mechanism through which the control, I/O, and any other special infrastructure partitions 14-24 may initiate communications with each other and with the respective guest partitions.

The partition monitors 36 in each partition constrain the guest OS and its applications to the assigned resources. Each monitor 36 implements a system call interface 32 that is used by the guest OS of its partition to request usage of allocated resources. The system call interface 32 includes protection exceptions that occur when the guest OS attempts to use privileged processor op-codes. Different partitions can use different monitors 36. This allows support of multiple system call interfaces 32 and for these standards to evolve over time. It also allows independent upgrade of monitor components in different partitions.

The monitor 36 is preferably aware of processor capabilities so that it may be optimized to utilize any available processor virtualization support. With appropriate monitor 36 and processor support, a guest OS in a guest partition (e.g., 26, 28) need not be aware of the control system of the invention and need not make any explicit 'system' calls to the monitor 36. In this case, processor virtualization interrupts provide the necessary and sufficient system call interface 32. However, to optimize performance, explicit calls from a guest OS to a monitor system call interface 32 are still desirable.

The monitor 36 also maintains a map of resources allocated to the partition it monitors and ensures that the guest OS (and applications) in its partition use only the allocated hardware resources. The monitor 36 can do this since it is the first code running in the partition at the processor's most privileged level. The monitor 36 boots the partition firmware at a decreased privilege. The firmware subsequently boots the OS and applications. Normal processor protection mechanisms prevent the firmware, OS, and applications from ever obtaining the processor's most privileged protection level.

Unlike a conventional VMM, a monitor 36 has no I/O interfaces. All I/O is performed by I/O hardware mapped to I/O partitions 16, 18 that use memory channels to communicate with their client partitions. A responsibility of a monitor 36 is instead to protect processor provided resources (e.g., processor privileged functions and memory management units). The monitor 36 also protects access to I/O hardware primarily through protection of memory mapped I/O. The monitor 36 further provides channel endpoint capabilities which are the basis for I/O capabilities between guest partitions.

The monitor 34 for the control partition 14 is a "lead" monitor with two special roles. It creates and destroys monitors 36, and also provides services to the created monitors 36 to aid processor context switches. During a processor context switch, monitors 34, 36 save the guest partition state in the virtual processor structure, save the privileged state in virtual processor structure and then invoke the control monitor switch service. This service loads the privileged state of the target partition monitor and switches to the target partition monitor which then restores the remainder of the guest partition state.

The most privileged processor level (e.g., x86 ring 0) is retained by having the monitors 34, 36 running below the system call interface 32. This is most effective if the processor implements at least three distinct protection levels: e.g., x86 ring 1, 2, and 3 available to the guest OS and applications. The control partition 14 connects to the monitors 34, 36 at the base (most privileged level) of each partition. The monitor 34 grants itself read only access to the partition descriptor in the control partition 14, and the control partition 14 has read only access to one page of monitor state stored in the resource database 33.

Those skilled in the art will appreciate that the monitors 34, 36 of the invention are similar to a classic VMM in that they constrain the partition to its assigned resources, interrupt handlers provide protection exceptions that emulate privileged behaviors as necessary, and system call interfaces are implemented for "aware" contained system code. However, as explained in further detail below, the monitors 34, 36 of the invention are unlike a classic VMM in that the master resource database 33 is contained in a virtual (control) partition for recoverability, the resource database 33 implements a simple transaction mechanism, and the virtualized system is constructed from a collection of cooperating monitors 34, 36 whereby a failure in one monitor 31, 36 need not result in failure of all partitions and need not result in the failure of a multiprocessor/multi-core partition; in particular, any symmetric multiprocessing system can, due to use of a monitor per execution core, preserve operation of the partition using remaining execution cores. Furthermore, failure of a single physical processing unit need not result in failure of all partitions of a system, since partitions are affiliated with different processing units.

The monitors 34, 36 of the invention are also different from classic VMMs in that each partition is contained by its assigned monitor(s), partitions with simpler containment requirements can use simpler and thus more reliable (and higher security) monitor implementations, and the monitor implementations for different partitions may, but need not be, shared. Also, unlike conventional VMMs, a lead monitor 34 provides access by other monitors 36 to the control partition resource database 33.

Partitions in the control environment include the available resources organized by host computing system 10. Available computing resources in a host node, also referred to herein as a host computing system are described by way of example in FIGS. 4-5. Generally, a partition is a software construct (that may be partially hardware assisted) that allows a hardware system platform (or hardware partition) to be "partitioned," or separated, into independent operating environments. The degree of hardware assist (e.g., physical hardware separation) is platform dependent but by definition is less than 100% (since by definition a 100% hardware assist provides hardware partitions). The hardware assist may be provided by the processor or other platform hardware features. For example, each partition may be associated with a separate processing core or cores, but may each be associated with a separate portion of the same system memory, networking resources, or other features. Or, partitions may time-share processing resources, but be associated with separate memory, networking, and/or peripheral devices. In general from the perspective of the control partition 14, a hardware partition is generally indistinguishable from a commodity hardware platform without partitioning hardware.

Unused physical processors are assigned to an 'Idle' partition 13. The idle partition 13 is the simplest partition that is assigned processor resources. It contains a virtual processor for each available physical processor, and each virtual processor executes an idle loop that contains appropriate processor instructions to minimize processor power usage. The idle virtual processors may cede time at the next control time quantum interrupt, and the monitor 36 of the idle partition 13 may switch processor context to a virtual processor in a different partition. During host bootstrap, the boot processor of the boot partition 12 boots all of the other processors into the idle partition 13.

In some embodiments, multiple control partitions 14 are also possible for large host partitions to avoid a single point of failure. Each would be responsible for resources of the appropriate portion of the host computing system 10. Resource service allocations would be partitioned in each portion of the host system 10. This allows clusters to run within a host computing system 10 (one cluster node in each zone) and still survive failure of a control partition 14.

As illustrated in FIGS. 1-3, each page of memory in a control partition-enabled host computing system 10 is owned by one of its partitions. Additionally, each hardware I/O device is mapped to one of the designated 110 partitions 16, 18. These I/O partitions 16, 18 (typically two for redundancy) run special software that allows the I/O partitions 16, 18 to run the I/O channel server applications for sharing the CO hardware. Alternatively, for I/O partitions executing using a processor implementing Intel's VT-d technology, devices can be assigned directly to non-I/O partitions. Irrespective of the manner of association, such channel server applications include Virtual Ethernet switch (provides channel server endpoints for network channels) and virtual storage switch (provides channel server endpoints for storage channels). Unused memory and I/O resources are owned by a special 'Available' pseudo partition (not shown in figures). One such "Available" pseudo partition per node of host computing system 10 owns all resources available for allocation, and as such is tracked by resource database 33.

In the embodiments discussed herein, control partition 14 concentrates on server input/output requirements. Plug and Play operating systems function with appropriate virtual port/miniport drivers installed as boot time drivers. The hypervisor system call interface 32 may, in some embodiments, include an Extensible Firmware Interface (EFI) to provide a modern maintainable firmware environment that is used as the basis for the virtual firmware. The firmware provides standard mechanisms to access virtual Advanced Configuration and Power Interface (ACPI) tables. These tables allow operating systems to use standard mechanisms to discover and interact with the virtual hardware.

The boot partition 12 may provide certain Basic Input/Output System (BIOS) compatibility drivers if and when necessary to enable boot of operating systems that lack EFI loaders. The boot partition 12 also may provide limited support for these operating systems.

Different partitions may use different firmware implementations or different firmware versions. The firmware identified by partition policy is loaded when the partition is activated. During an upgrade of the monitor associated with the control partition, running partitions continue to use the loaded firmware, and may switch to a new version as determined by the effective partition policy the next time the partition is reactivated.

As noted above, monitors 36 provide enforcement of isolation from other partitions. The monitors 36 run at the most privileged processor level, and each partition has one or more monitors mapped into privileged address space. Each monitor 36 uses protection exceptions as necessary to monitor software within the virtual partition and to thwart any (inadvertent) attempt to reference resources not assigned to the associated virtual partition. Each monitor 36 constrains the guest OS and applications in the guest partitions 26, 28, and the lead monitor 34 constrains the resource management application in the control partition 14 and uses its access and special hypervisor system call interface 32 with the resource management application to communicate individual partition resource lists with the associated partition monitors 36.

According to some embodiments, there are two main categories of partitions in the virtualization system of the present disclosure. The 'user' partitions run guest operating systems for customer applications, and the system infrastructure partitions provide various platform infrastructure services. For reliability, the virtualization system architecture minimizes any implementation that is not contained within a partition, since a failure in one partition can be contained and need not impact other partitions.

As will be explained in more detail below, system partition, or service partition, types can include:

Boot 12
Idle 13
Control 14
Command 20
Operations 22
I/O 16, 18
Interconnect 24

Each of these types is briefly discussed below.
Boot Partition 12

The boot partition 12 has assigned thereto one virtual CPU (corresponding to a physical processing core or a fractional/timeshared part thereof), and contains the hardware partition boot firmware. It is used during recovery operations when necessary to boot and reboot the command partition 20 and the I/O partitions 16, 18. During bootstrap, the boot partition 12 reserves available memory and constructs the control partition 14 and the initial resource map in resource database 33 with all memory assigned either to the boot partition 12, the control partition 14, or the available partition. The boot partition 12 initiates transactions to the resource manager application until it has also booted the command partition 20. At this point the control partition 14 is attached to the command partition 20 and accepts only its command transactions. The boot partition boot processor also initializes all additional processors to run the idle partition 13.

Idle Partition 13

In example embodiments, the idle partition 13 has one virtual CPU for each physical CPU. These virtual CPUs are used as place holders in the system's CPU schedule. If the control partition 14 or partition monitor 34 error recovery must remove a CPU/partition from the schedule, it is replaced with a reference to one of these virtual CPUs. Idle processors 'run' in the idle partition 13, rather than the control partition 14, to reduce the scope of error recovery should a hardware error occur while a hardware processor is idle. In actuality, the idle partition suspends a processor (to reduce power and cooling load) until the next virtual quantum interrupt. In typical scenarios, processors can be idle a significant fraction of time. The idle time is the current shared processor headroom in the hardware partition.

Control Partition 14

The control partition 14 owns the memory that contains the resource database 33 that stores the resource allocation maps. This includes the 'fractal' map for memory, the processor schedule, and mapped I/O hardware devices. For Peripheral Component Interconnect (PCI) I/O hardware, this map would allocate individual PCI devices, rather than require I/O partitions 16, 18 to enumerate a PCI bus. Different devices on the same PCI bus can be assigned to different I/O partitions 16, 18. A resource allocation application in the control partition 14 tracks the resources, applies transactions to the resource database 33, and is also the server for the command and control channels. The resource allocation application runs in the control partition 14 with a minimal operating environment. All state changes for the resource manager application are performed as transactions. If a processor error occurs when one of its virtual CPUs is active, any partial transactions can be rolled back. The hypervisor system call interface 32, which is responsible for virtual processor context switches and delivery of physical and virtual interrupts, does not write to the master resource maps managed by the application. It constrains itself to memory writes of memory associated with individual partitions and read only of the master resource maps in the resource database 33.

It is noted that, when multiple control partitions 14 are used, an associated command partition 20 can be provided for each. This allows the resource database 33 of a large host to be (literally) partitioned and limits the size of the largest virtual partition in the host while reducing the impact of failure of a control partition 14. Multiple control partitions 14 are recommended for (very) large host partitions, or anytime a partitioned virtualized system can contain the largest virtual partition.

Command Partition 20

In example embodiments, the command partition 20 owns the resource allocation policy for each hardware partition 10. The operating environment is, for example, XP embedded which provides a .NET Framework execution environment. Another possibility is, for example, Windows CE and the .NET Compact Framework.

The command partition 20 maintains a synchronized snapshot of the resource allocation map managed by the resource management application, and all changes to the map are transactions coordinated through the command channel 38 (FIG. 3) with the control partition 14. The resource management application implements the command channel 38 to accept transactions only from the command partition 20.

It is noted that in a multiple host hardware partition environment, a stub command partition 20 in each host 10 could simply run in the EFI environment and use an EFI application to pipe a command channel 38 from the control partition 14, through a network, to a shared remote command partition 20. However, this would have an impact on both reliability and recovery times, while providing only a modest cost advantage. Multiple command partitions 20 configured for failover are also possible, especially when multiple control partitions 14 are present. Restart of a command partition 20 occurs while other partitions remain operating with current resource assignments.

In accordance with the present disclosure, only a resource service in the command partition 20 makes requests of the resource manager application in the control partition 14. This allows actual allocations to be controlled by policy. Agents representing the partitions (and domains, as described below) participate to make the actual policy decisions. The policy service provides a mechanism for autonomous management of the virtual partitions. Standard and custom agents negotiate and cooperate on the use of physical computing resources, such as processor scheduling and memory assignments, in one or more physical host partitions. There are two cooperating services. The partition resource service is an application in the command partition 20 that is tightly coupled with the control resource manager application and provides services to a higher level policy service that runs in the operations partition 22 (described below) and is tightly coupled with (i.e. implements) a persistent partition configuration database, and is a client of the resource service. The resource service also provides monitoring services for the presentation tier. The partition resource objects are tightly controlled (e.g. administrators can not install resource agents) since the system responsiveness and reliability partially depends on them. A catastrophic failure in one of these objects impacts responsiveness while the server is restarted. Recurring catastrophic failures can prevent changes to the resource allocation.

Operations Partition 22

In some embodiments, the operations partition 22 owns the configuration policy for the domains in one or more host computing systems 10. The operations partition 22 is also where a data center operations (policy) service runs. As will be explained below, at least one host computing system 10 in a given virtual data center will have an operations partition 22. Not all host computing systems 10 run an operations partition 22. An operations partition 22 may be provided by multiple hosts in a virtual data center for load, balancing and failover. The operations partition 22 does not need to run within a given hardware partition, and need not run as a virtual partition. The operating environment within the operations partition 22 can be, for example, MICROSOFT WINDOWS XP Professional or Windows Server, or analogous operating environments. This partition (cluster) can be shared across multiple hardware partitions. The configuration policy objects and ASP.NET user interface components run in the operations partition 22. These components can share a virtual partition with the command partition 20 to reduce cost for single host deployments.

For availability reasons, customization of partition resource agents is discouraged in favor of customization of policy agents. This is because a failure in a policy agent has less impact than a resource agent to the availability and responsiveness of the resource mechanisms. The policy agents make requests of the standard resource agents. The standard policy agents can also be extended with custom implementations. In simple single hardware partition installations, the services of the operations partition 22 can be hosted in the command partition 20.

The partition definition/configuration objects are intended to be a purpose of customization. The partition policy objects are clients of the resource objects. The policy service provides configuration services for the presentation tier.

The operations partition user interface components are typically integrated within the operations partition 22. An exemplary implementation may use Hypertext Markup Language (HTML) Version 4, CSS, and Jscript. The operations partition user interface is principally a web interface implemented by an ASP.NET application that interacts with the policy service. The user interface interacts directly with the Partition Policy Service and indirectly with a partition database of the operations partition 22.

A .NET smart client may also be provided in the operations partition 22 to provide a rich client interface that may interact directly with the policy and resource services to present a rich view of current (enterprise) computing resources.

A resource service in the command partition 20 selects appropriate resources and creates a transaction to assign the resources to new partitions. The transaction is sent to the control partition 11 which saves transaction request to un-cached memory as a transaction audit log entry (with before and after images). The transaction is validated and applied to the resource database 33.

An audit low, tracks changes due to transactions since the last time the resource database 33 was backed up (flushed to memory), thereby allowing transactions to be rolled back without requiring the resource database 33 to be frequently flushed to memory. The successful transactions stored in the audit log since the last resource database 33 backup may be reapplied from the audit log to restart a failed partition. A resource also may be recovered that has been reserved by a completed transaction. A transaction that has not completed has reserved no resource. The audit log may be used by the resource allocation software to rollback any partially completed transaction that survived the cache. It should be noted that a transaction that has not completed would have assigned some but not all resources specified in a transaction to a partition and the rollback would undo that assignment if it survived, the cache.

I/O Partitions 16, 18

In the embodiment shown, a plurality of I/O partitions 16, 18 are active on a host node 10. I/O partitions 16, 18 allow multi-path I/O from the user partitions 26-28 and allow certain types of failures in an I/O partition 16, 18 to be recovered transparently. All I/O hardware in host hardware partitions is mapped to the I/O partitions 16, 18. These partitions are typically allocated a dedicated processor to minimize latency and allow interrupt affinity with limited overhead to pend interrupts that could occur when the I/O partition 16, 18 is not the current context. The configuration for the I/O partitions 16, 18 determines whether the storage, network, and console components share virtual partitions or run in separate virtual partitions.

Interconnect Service Partition 24

The interconnect service partition 24 coordinates inter-partition communication in conjunction with the control partition 14 and the command partition 20. Generally, and as discussed in further detail below, the interconnect service partition 24 defines and enforces policies relating to inter-communication of partitions defined in the command partition, and publishes an application programming interface (API) that acts as a command-based interconnect that provides the various guest partitions and I/O partitions 16, 18 intercommunication capabilities.

In some embodiments, the interconnect service partition 24 defines one or more security policies for each of the partitions included on all platforms, including the platform on which it resides. The interconnect service partition 24 implements permissions defined in such security policies to ensure that partitions intercommunicate only with those other partitions to which they are allowed to communicate. To that end, and as discussed in further detail below, the interconnect service partition 24 can define one or more security zones, each of which defining a "virtual fabric" of platforms capable of intercommunication. As such, each security zone represents a virtual network of interconnected partitions. Each virtual network defined by the interconnect service partition 24 can be configured such that partitions within the virtual fabric can intercommunicate, but partitions not included within that virtual fabric are incapable of communicating with member partitions (e.g., unless both of those partitions are part of a different virtual fabric). By defining a plurality of virtual fabrics within each system, partitions are by default untrusted, or closed, rather than trusted, or open. That is, in the absence of defined virtual fabrics, the partitions are assumed able to intercommunicate. However, with defined virtual fabrics, only those partitions defined as part of a common virtual fabric will intercommunicate, with partitions otherwise, by default, unable to communicate.

In addition, the interconnect service partition 24 defines one or more rights assignable to each virtual fabric by way of the security policy, thereby allowing each virtual fabric to have assigned a variety of types of rights or services to each partition or virtual fabric. As further discussed below, virtual fabrics including one or more guest partitions 26, 28 can be constructed in which a particular quality of service (e.g., reliability, uptime, or dedicated levels of processing and/or memory and/or bandwidth resources) is associated with a particular virtual fabric. To ensure such service uptime, one or more different or redundant partitions can be dynamically added to or subtracted from the virtual fabric.

User Partitions 26-28

The user partitions 26, 28 host the workloads that form the purpose of the virtualization system, and are described in normal domains for a user. These are the partitions that a user primarily interacts with. All of the other partition types are described in the system domains and are generally kept out of view of typical users.

System Startup

When the host computing system 10 is booted, the EFI firmware is loaded first. The EFI firmware boots the operating system associated with the control partition 14. The EFI firmware uses a standard mechanism to pick the boot target. Assuming the loader is configured and selected, boot proceeds as follows.

The loader allocates almost all of available memory to prevent its use by the firmware. (It leaves a small pool to allow proper operation of the firmware.) The loader then creates the resource database's memory data structures in the allocated memory (which includes a boot command channel predefined in these initial data structures). The loader then uses the EFI executable image loader to load the control monitor 34 and monitoring application into the control partition 14. The loader also jacks the boot monitor underneath the boot partition 12 at some point before the boot loader is finished.

The loader then creates transactions to create the I/O partition 16 and command partition 20. These special boot partitions are loaded from special replicas of the master partition definitions. The command partition 20 updates these replicas as necessary. The boot loader loads the monitor, and firmware into the new partitions. At this point, the boot loader transfers boot path hardware ownership from the boot firmware to the I/O partition 16. The I/O partition 16 begins running and is ready to process I/O requests.

The loader creates transactions to create a storage channel from the command partition 20 to an I/O partition 16, and a command channel 38 from the command partition 20 to the control partition 14. At this point the boot loader sends a final command to the control partition 14 to relinquish the command channel 38 and pass control to the command partition 20. The command partition 20 begins running and is ready to initialize the resource service.

The command partition operating environment is loaded from the boot volume through the boot storage channel path. The operating environment loads the command partition's resource service application. The resource service takes ownership of the command channel 38 and obtains a snapshot of the resources from the control partition's resource database 33.

A fragment of the policy service is also running in the command partition 20. This fragment contains a replica of the infrastructure partitions assigned to this host. The policy service connects to the resource service and requests that the 'boot' partitions are started first. The resource service identifies the already running partitions. By this time, the virtual boot partition 12 is isolated and no longer running at the most privileged processor level. The virtual boot partition 12 can now connect to the I/O partition 16 as preparation to reboot the command partition 20. If all I/O partitions should fail, the virtual boot partition 12 also can connect to the control partition 14 and re-obtain the boot storage hardware. This is used to reboot the first I/O partition 16.

The boot partition 12 remains running to reboot the I/O and command partitions 16, 20 should they fail during operation. The control partition 14 implements watchdog timers to detect failures in these (as well as any other) partitions. The policy service then activates other infrastructure partitions as dictated by the current policy. This would typically start the redundant 110 partition 18.

If the present host computing system 10 is a host of an operations partition 22, operations partition 22 is also started at this time. The command partition 20 then listens for requests from the distributed operations partitions. As will be explained below, the operations partition 22 connects to command partitions 20 in this and other hosts through a network channel and network zone. In a simple single host implementation, an internal network can be used for this connection. At this point, the distributed operations partitions 22 start the remaining partitions as the current policy dictates.

All available (not allocated) memory resources are owned by the special 'available' partition. In the example of FIGS. 1 and 2, the available partition is size is zero and thus is not visible.

Referring to FIG. 3, virtual channels are the mechanism partitions use in accordance with the invention to connect to zones and to provide fast, safe, recoverable communications amongst the partitions. For example, virtual channels provide a mechanism for general I/O and special purpose client/server data communication between guest partitions 26, 28 and the I/O partitions 16, 18 in the same host. Each virtual channel provides a command and I/O queue (e.g., a page of shared memory) between two partitions. The memory for a channel is allocated and 'owned' by the guest partition 26, 28. These queues are discussed in farther detail below in connection with the interconnect Application Programming Interface (API) as illustrated in FIGS. 6-9. The control partition 14 maps the channel portion of client memory into the virtual memory space of the attached server partition. The control application tracks channels with active servers to protect memory during teardown of the owner guest partition until after the server partition is disconnected from each channel. Virtual channels can be used for command, control, and boot mechanisms as well as for traditional network and storage I/O.

As shown in FIG. 3, the control partition 14 has a channel server 40 that communicates with a channel client 42 of the command partition 20 to create the command channel 38. The I/O partitions 16, 18 also include channel servers 44 for each of the virtual devices accessible by channel clients 46, such as in the operations partition 22, interconnect service partition 24, and one or all guest partitions 26, 28. Within each guest virtual partition 26, 28, a channel bus driver enumerates the virtual devices, where each virtual device is a client of a virtual channel. The dotted lines in I/O partition 16 represent the interconnects of memory channels from the command partition 20 and operations partitions 22 to the virtual Ethernet switch in the I/O partition 16 that may also provide a physical connection to the appropriate network zone. The dotted lines in I/O partition 18 represent the interconnections to a virtual storage switch. Redundant connections to the virtual Ethernet switch and virtual storage switches are not shown in FIG. 3. A dotted line in the control partition 14 from the command channel server 40 to the transactional resource database 33 shows the command channel connection to the transactional resource database 33.

A firmware channel bus (not shown) enumerates virtual boot devices. A separate bus driver tailored to the operating system enumerates these boot devices as well as runtime only devices. Except for I/O virtual partitions 16, 18, no PCI bus is present in the virtual partitions. This reduces complexity and increases the reliability of all other virtual partitions.

Virtual device drivers manage each virtual device. Virtual firmware implementations are provided for the boot devices, and operating system drivers are provided for runtime devices. The device drivers convert device requests into channel commands appropriate for the virtual device type.

Additional details regarding possible implementation details of a partitioned, para-virtualization system, including discussion of multiple are discussed in U.S. Pat. No. 7,984,104, assigned to Unisys Corporation of Blue Bell, Pa., the disclosure of which is hereby incorporated by reference in its entirety. Other example partitioning mechanisms, and additional details regarding partitioning within such a computing arrangement, are described in copending U.S. patent application Ser. No. 14/133,803, entitled "INTERCONNECT PARTITION BINDING API, ALLOCATION AND MANAGEMENT OF APPLICATION-SPECIFIC PARTITIONS", the disclosure of which is hereby incorporated by reference in its entirety.

II. Computing Systems Used to Establish SR-IOV Functionality

Figure 4:
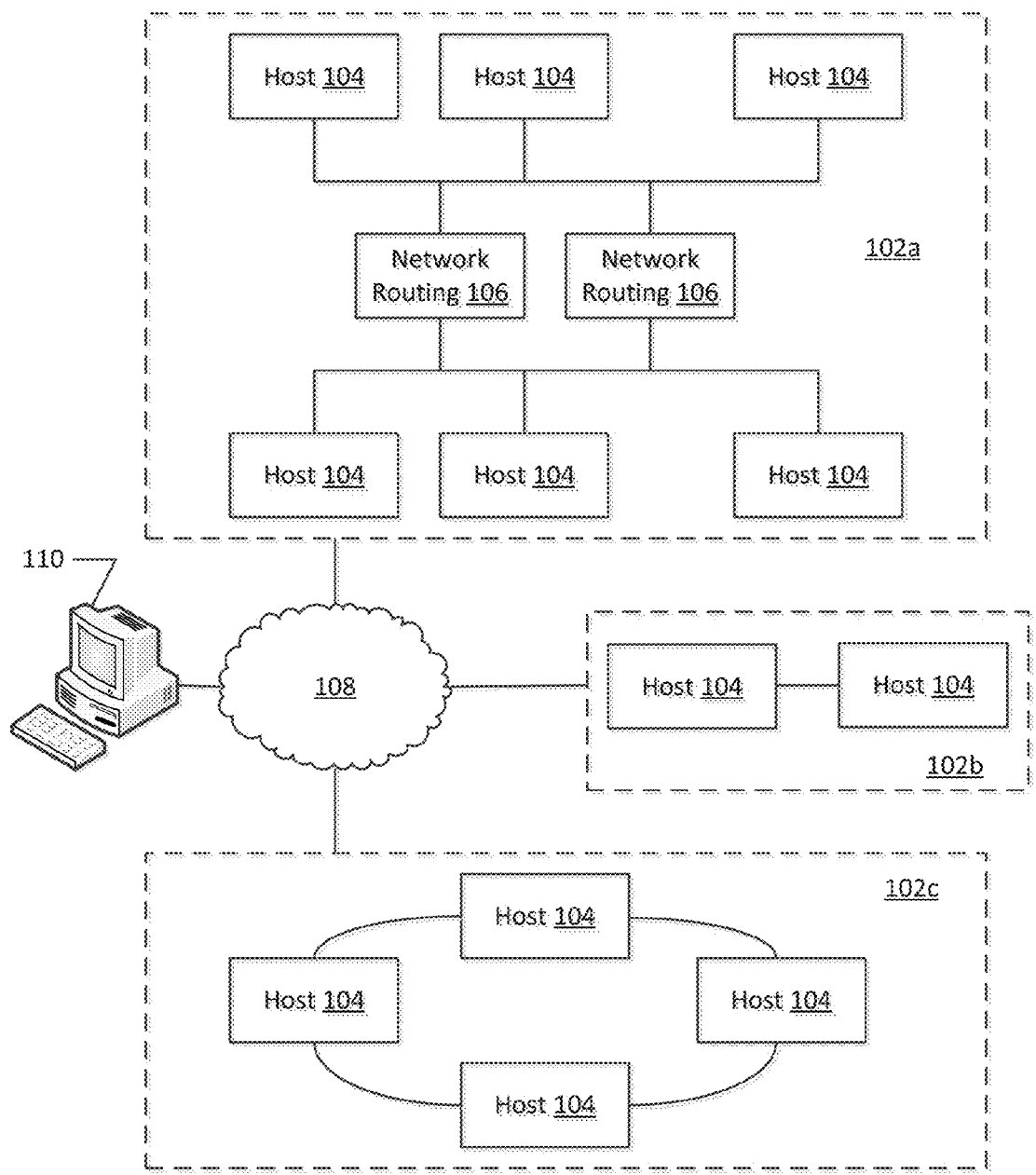
FIG. 4 illustrates a distributed multi-host system in which aspects of the present disclosure can be implemented.
Figure 5:
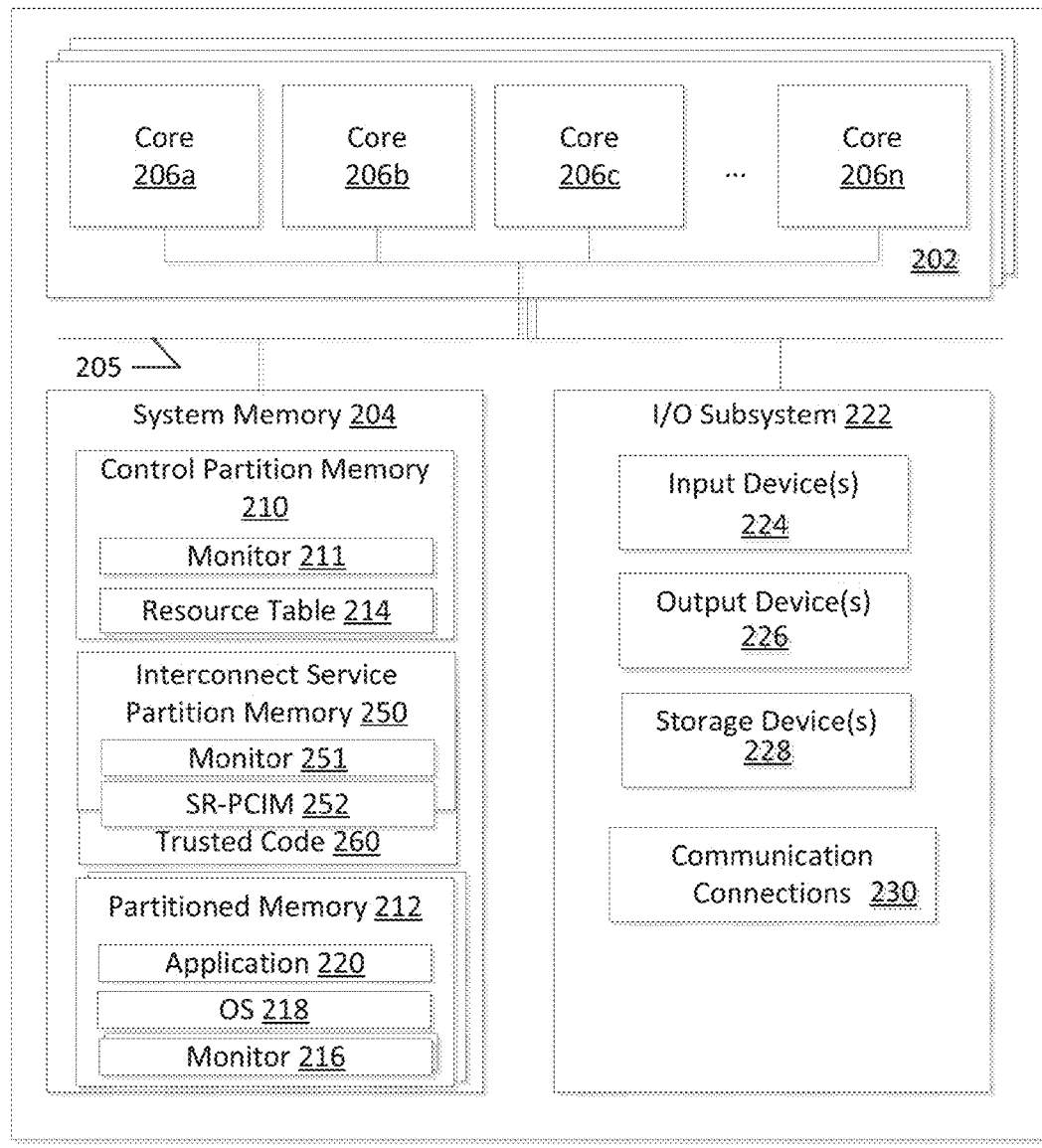
FIG. 5 illustrates an example block diagram of a host computing system useable to implement the para-virtualization systems of FIGS. 1-3, above.
Figure 5:

Referring now to FIGS. 4-5, example arrangements of computing resources are illustrated for establishing a para-virtualization system across a plurality of host computing systems, such as host computing systems 10 of FIGS. 1-3, are shown. In particular, FIGS. 4-5 illustrate example computing, resources in which the para-virtualization systems described herein can be implemented.

As illustrated in FIG. 4, a system 100 in which the para-virtualization systems of the present disclosure can be implemented is shown. The system 100 is, in the embodiment shown, distributed across one or more locations 102, shown as locations 102*a-c*. These can correspond to locations remote from each other, such as a data center owned or controlled by an organization, a third-party managed computing cluster used in a "cloud" computing arrangement, or other local or remote computing resources residing within a trusted grouping. In the embodiment shown, the locations 102*a-c* each include one or more host systems 104. The host systems 104 represent host computing systems, and can take any of a number of forms. For example, the host systems 104 can be server computing systems having one or more processing cores and memory subsystems and are useable for large-scale computing tasks. In one example embodiment, a host system 104 can be as illustrated in FIG. 5.

As illustrated in FIG. 4, a location 102 within the system 100 can be organized in a variety of ways. In the embodiment shown, a first location 102*a* includes network routing equipment 106, which routes communication traffic among the various hosts 104, for example in a switched network configuration. Second location 102*b* illustrates a peer-to-peer arrangement of host systems. Third location 102*c* illustrates a ring arrangement in which messages and/or data can be passed among, the host computing systems themselves, which provide the routing of messages. Other types of networked arrangements could be used as well.

In various embodiments, at each location 102, the host systems 104 are interconnected by a high-speed, high-bandwidth interconnect, thereby minimizing latency due to data transfers between host systems. In an example embodiment, the interconnect can be provided by an Infiniband switched fabric communications link; in alternative embodiments, other types of interconnect technologies, such as Fibre Channel, PCI Express, Serial ATA, or other interconnect could be used as well.

Among the locations 102*a-c*, a variety of communication technologies can also be used to provide communicative connections of host systems 104 at different locations. For example, a packet-switched networking arrangement, such as via the Internet 108, could be used. Preferably, the interconnections among locations 102*a-c* are provided on a high-bandwidth connection, such as a fiber optic communication connection.

In the embodiment shown, the various host system 104 at locations 102*a-c* can be accessed by a client computing system 110. The client computing system can be any of a variety of desktop or mobile computing systems, such as a desktop, laptop, tablet, smartphone, or other type of user computing system. In alternative embodiments, the client computing system 110 can correspond to a server not forming a cooperative part of the para-virtualization system described herein, but rather which accesses data hosted on such a system. It is of course noted that various virtualized partitions within a para-virtualization system could also host applications accessible to a user and correspond to client systems as well.

It is noted that, in various embodiments, different arrangements of host systems 104 within the overall system 100 can be used; for example, different host systems 104 may have different numbers or types of processing cores, and different capacity and type of memory and/or caching subsystems could be implemented in different ones of the host system 104. Furthermore, one or more different types of communicative interconnect technologies might be used in the different locations 102*a-c*, or within a particular location.

Referring to FIG. 5, an example block diagram of a host computing system 200 usable to implement the para-virtualization systems of FIGS. 1-3, is shown. The host computing system 200 can, in some embodiments, represent an example of a host system 104 of FIG. 4, useable within the system 100. The host computing system 200 includes one or more processing subsystems 202, communicatively connected to a system memory 204. Each processing subsystem 202 can include one or more processing cores 206, shown as processing cores 206*a-n*. Each processing core can, in various embodiments, include one or more physical or logical processing units capable of executing computer-readable instructions. In example embodiments, the processing cores 206*a-n* can be implemented using any of a variety of x86 instruction sets, such as x86, x86-64, or IA64 instruction set architectures. In alternative embodiments, other instruction set architectures, such as ARM, MIPS, Power, SPARC, or other types of computing set architectures could be used.

In addition, each of the processing subsystems 202 can include one or more card-based processing subsystems including a plurality of sockets for supporting execution cores 206*a-n*, or alternatively can support a socket-based or mounted arrangement in which one or more execution cores are included on a single die to be mounted within the host computing system 200. Furthermore, in the embodiment shown, a plurality of processing subsystems 202 can be included in the host computing system, thereby providing a system in which one or more cores could be allocated to different partitions hosted by the same computing hardware; in alternative embodiments, a single processing subsystem including one or more processing cores 206*a-n* could be included in the host computing system 200, and that processing subsystem 202 could be implemented without separation from system memory 204 by a card-based implementation.

As illustrated, the system memory 204 is communicatively interconnected to the one or more processing subsystems 202 by way of a system bus 205. The system bus is largely dependent upon the architecture and memory speed support of the processing subsystems with which it is implemented; although example systems provide different frequencies and throughputs of such system buses, in general the bus system between processing subsystems 202 and the system memory is a low-latency, high bandwidth connection useable to rapidly retrieve data from the system memory 204. System memory 204 includes one or more computer storage media capable of storing data and/or instructions in a manner that provides for quick retrieval of such data and/or instructions by a corresponding processing core 206. In different embodiments, the system memory 204 is implemented in different ways. For example, the memory 204 can be implemented using various types of computer storage media.

In the embodiment shown, system memory 204 can be allocated to one or more partitions using the software described herein. In the example illustration shown, subsections of the system memory 204 can be allocated to a control partition section 210 and one or more memory partitions 212. The control partition section 210 includes a monitor 211, which in some embodiments can represent monitor 34. The control partition section 210 can also include a resource database 214 that tracks resources allocated to other partitions within the host computing system 200. This can include, for example, a listing of execution cores 206, capacity and location of system memory 204, as well as I/O devices or other types of devices associated with each partition. In example embodiments, the resource database 214 can correspond to database 33 of FIGS. 1-3.

In the embodiment shown, the system memory 204 includes memory partitions 212 which each are associated with different partitions formed within a host computing system 200. The memory partitions 212 can, in the embodiment shown, each include a monitor 216, an associated operating system 218, and one or more applications or workloads 220 to be executed within the partition. Since each memory partition 212 can be associated with one or more execution cores 206 in the resource database 214, the assigned execution cores can be used to access and execute the monitor software 216 as well as the operating system 218 and workloads 220.

It is noted that in some embodiments, the partition 212 may include multiple instances of the monitor software 216. This may be the case, for example, for partitions that have allocated thereto more than one execution core. For such cases, monitor software 216 may be allocated for and used with each execution core. Therefore, there may be more than one such monitor executing per partition, with each monitor handling various I/O, memory, or interrupt servicing tasks that may be issued with respect to that particular execution core. Each monitor supervises execution of software within a partition as allocated to a particular execution n core; accordingly, if a single partition has multiple execution cores, the operating system 218 may allocate execution of operating system tasks, or the workload(s) 220, to one or both of the execution cores. The host computing device includes an I/O subsystem 222 that includes one or more input devices 224, output devices 226, and storage devices 228. The input devices 224 can include, for example, a keyboard, a mouse, a pen, a sound input device, a touch input device, etc. Output device(s) 226 can include, for example, a display, speakers, a printer, etc. The aforementioned devices are examples and others may be used. Storage devices 228 store data and software instructions not directly accessible by the processing subsystems 202. In other words, the processing subsystems 202 perform an I/O operation to retrieve data and/or software instructions from the storage device 228. In various embodiments, the secondary storage device 228 includes various types of computer storage media. For example, the secondary storage device 228 can include one or more magnetic disks, magnetic tape drives, optical discs, solid state memory devices, and/or other types of computer storage media.

The I/O subsystem 222 further includes one or more communication connections 230. The communication connections 230 enable the computing device 1000 to send data to and receive data from a network of one or more such devices. In different embodiments, the communication connections can be implemented in different ways. For example, the communications connections can include a network interface card implementing an Ethernet interface, a token-ring network interface, a fiber optic network interface, a wireless network interface (e.g., Wi-Fi, Max, etc.), or another type of network interface. The communication connections 232 can also include an inter-system communication connection for direct data communication between computing systems, such as a Infiniband switched fabric communications link, or a Fibre Channel, PCI Express, Serial ATA, or other type of direct data communication link.

It is noted that, in some embodiments of the present disclosure, other arrangements of a partition may be included as well, providing various allocations of execution cores 206, system memory 204, and I/O devices 224, 226 within the I/O subsystem 222. For example, a partition may include zero or more execution cores 206; in the event that no processor is included with the partition, the partition may lack a monitor 216, and may instead of having an executable operating system 218 may instead include a library of commands accessible to one or more services partitions, for example useable to provide I/O or memory services to those other service partitions. Furthermore, a particular partition could be allocated access to a storage device 228 or communication connections 230.

It is noted that in the present embodiment an interconnect service partition 250 and a trusted code section 260 maintained in the system memory 204. The interconnect service partition 250 maintains a monitor 251 providing virtualization services. The interconnect service partition 250 and trusted code section 260, described in further detail below in connection with FIGS. 6-11, host a single-root PCI manager (SR-PCIM) 252 which manages I/O device drivers used for virtualization of I/O devices across guest partitions located in partitioned memory 212.

It is noted that, in typical hypervisor arrangements, failures occurring in one execution core allocated to the partition result in failure of the partition overall, since the failure results in failure of the monitor associated with the partition. In connection with the present disclosure, partitions including multiple monitors can potentially recover from such failures by restarting the execution core and associated monitor using the remaining, correctly-executing monitor and execution core. Accordingly, the partition need not fail.

As used in this document, a computer storage medium is a device or article of manufacture that stores data and/or computer-executable instructions. Computer storage media may include volatile and nonvolatile, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, DDR4 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Computer storage media generally includes at least some tangible, non-transitory media and can, in some embodiments, exclude transitory wired or wireless signals. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as Wi-Fi, acoustic, radio frequency (RF), infrared, and other wireless media. In accordance with the present disclosure, the term computer readable media as used herein may include computer storage media, but generally excludes entirely transitory embodiments of communication media, such as modulated data signals.

Furthermore, embodiments of the present disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIGS. 4-5 may be integrated onto a single integrated circuit. Such an SOC device may include one or more processing units, graphics units, communications units, system virtualization units and various application functionality all of which are integrated (or "burned") onto the chip substrate as a single integrated circuit. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Although particular features are discussed herein as included within a host computing system 200, it is recognized that in certain embodiments not all such components or features may be included within a computing device executing according to the methods and systems of the present disclosure. Furthermore, different types of hardware and/or software systems could be incorporated into such an electronic computing device.

III. SR-IOV Management and Operation

Referring now to FIGS. 6-11, details regarding implementation of a single-root I/O virtualization (SR-IOV) implementation that presents such I/O devices and manages I/O devices in a partition or virtual machine (rather than in the virtualization software itself) are illustrated. As briefly described above, the implementations provided in FIGS. 6-11 allow for redundancy and failover of not only virtual functions in an SR-IOV framework, but fault tolerance in the physical function and single root PCI manager (SR-PCIM). The system also allows the SR-PCIM to be able to determine the contents of ECAM memory that is otherwise stored in a privileged location not typically accessible to software executing within a virtualized partition.

Figure 6:
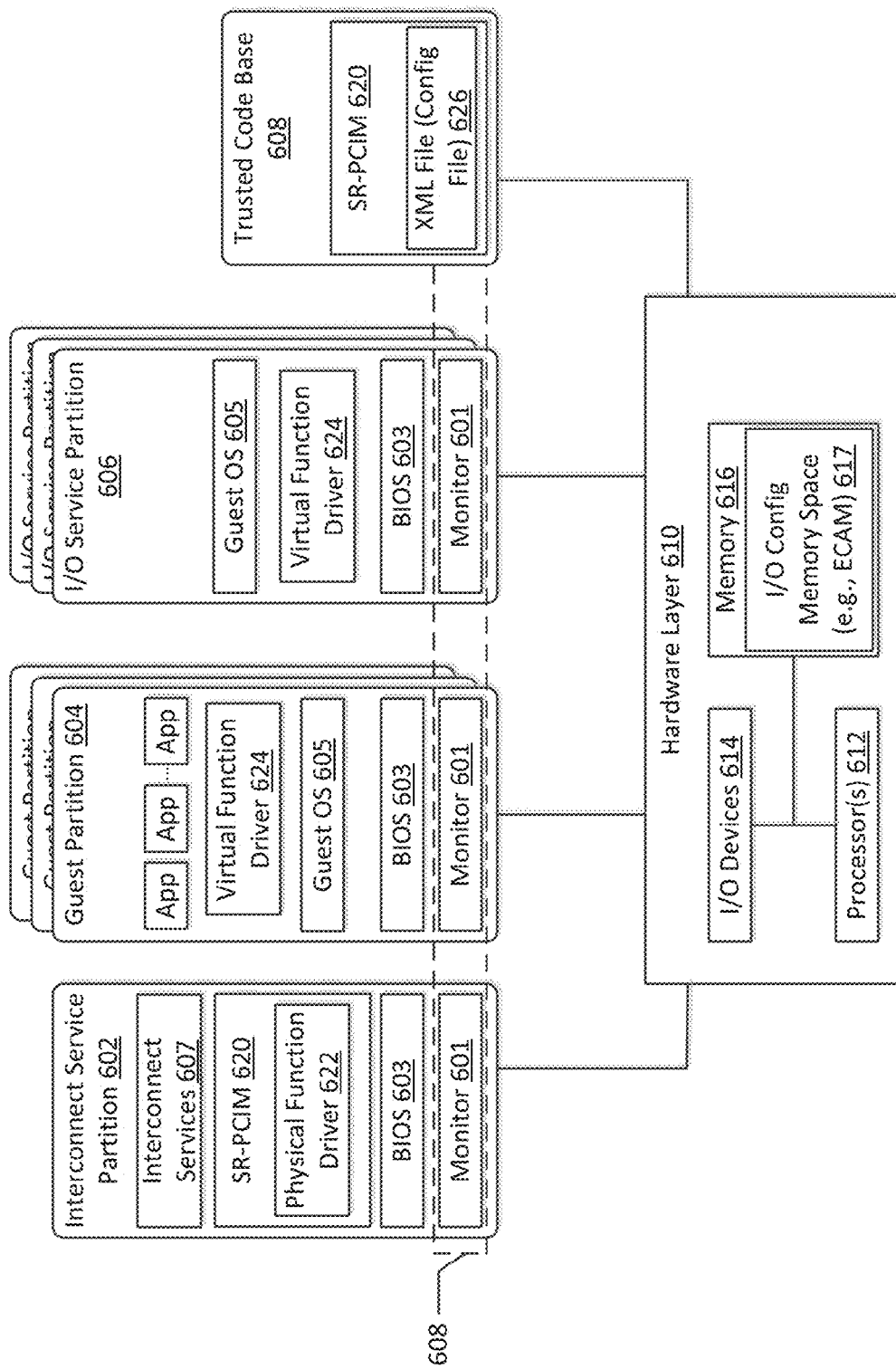
FIG. 6 illustrates a general block diagram of a multi-partition system managing SR-IOV device operations in a para-virtualization system of the present disclosure, according to an example embodiment.

Referring first to FIG. 6, an example multi-partition environment 600 in which aspects of the present disclosure can be embodied is discussed. In the environment 600 as shown, an interconnect service partition 602, as well as a plurality of pest partitions 604 and a plurality of I/O service partitions 606 are shown, alongside a trusted code base (TCB) 608, each executing on a hardware layer 610. It is noted that other partitions or partition types can and typically will be executing on the hardware layer as well, for example as discussed above in connection with FIGS. 1-3 (e.g., the boot partition, idle partition, and other service partitions discussed therein). Each of the interconnect service partition 602, guest partitions 604, and I/O service partitions 606 generally perform the functions as discussed above in FIG. 103 with respect to correspondingly-named partitions. In addition a trusted code base 608 can be used to perform low-level, privileged operations, and can be granted access at a very high privilege level (i.e., maximizing its right to view/modify system memory).

Furthermore, the hardware layer 610 generally includes one or more processing cores 612, I/O devices 611, and a memory 616. The hardware layer 610 can be implemented in any manner suitable for use within a distributed multi-partition system, for example in the same or different host systems. Any such host system as described above in connection with FIGS. 4-5 would be suitable, in connection with the present disclosure.

In the embodiment shown in FIG. 6, each of the interconnect service partition. 602, guest partitions 604, and I/O service partitions 606 include a monitor 601 operating as virtualization software. Each also has a virtual BIOS, shown as BIOS 603, that allows for booting into an operating system of that partition, such as a Guest OS 605, or in the case of the interconnect service partition 602, optionally instead a collection of interconnect services 607.

In the embodiment shown, the I/O devices 614 in the hardware layer 610 include at least one SR-IOV-compliant device capable of being mapped from one physical function to a plurality of virtual functions. Accordingly an I/O configuration space 617 is included within memory 616, and includes I/O configuration memory settings, for example defining mappings between physical and virtual functions of one or more SR-IOV compliant devices. Example memory arrangements for the I/O configuration space 617 are provided in the Single Root I/O Virtualization and Sharing Specification, Revision 1.1, dated Jan. 20, 2010, the contents of which are hereby incorporated by reference in their entirety.

In the embodiment shown, the interconnect service partition 602 is configured to manage SR-IOV devices by maintaining the physical functions, while virtual functions are distributed among partitions intended as users of particular I/O device functionality. For example, one physical function may be assigned to an interconnect service partition and may be associated with one I/O service partition 606, and two or more guest partitions 604. Alternative arrangements in which virtual functions are assigned to different numbers or types of partitions are possible as well, and only depend on the selected configuration of the partitions, as is apparent herein.

In the embodiment shown, a single root PCI manager application (SR-PCIM) 620 is maintained partially within the interconnect service partition 602, as well as within the trusted code block 608. The SR-PCIM 620 manages configuration of the physical function and virtual functions associated with each SR-IOV-compliant I/O device. In particular, SR-PCIM is the software responsible for the configuration of the SR-IOV capability, processing of associated error events and overall device controls such as power management and hot-plug services for physical and virtual functions.

In the embodiment shown, the SR-PCIM 620 manages storage of a physical function driver 622 associated with a physical function of an I/O device (e.g., one of I/O devices 614), and tracks an association of that physical function to virtual functions included in other partitions, such as guest partitions 604 and I/O service partitions 606. The physical function driver 622 defines the interface useable by software to access functionality of the I/O device associated with that driver, which is made available via virtual function drivers 624 present in other partitions, and which can be loaded by the operating systems of those other partitions to access the I/O device(s) 614.

In example embodiments, the physical function driver 622 is generally a Linux-compliant device driver useable in connection with a SR-IOV-compliant device. However, in some embodiments, the physical function driver 622 can be modified to directly read from the I/O configuration space 617.

Because the SR-PCIM 620 is to a large extent a trusted code block, it as such at least partially resides in domain 0 on the host where it resides (e.g., within the trusted code base 608). Furthermore, the SR-PCIM manages the extent to which the interconnect service partition 602 is allowed to do using the physical function driver 622. In example embodiments, monitors 601 associated with other partitions, such as the interconnect service partition 602, guest partition 604, or I/O service partition 606 can each also be included in a trusted code base and given domain 0, or root access, to the hardware on the host system. Accordingly, various SR-IOV functions can be distributed between the trusted code base 608 and the various monitors 601 as may be advantageous in different embodiments.

In the embodiment shown, the trusted code base 608 further includes a configuration file 626, shown as an XML file. The configuration file 626 stores information defining mappings between hardware devices and physical functions, including physical function drivers, as well as mappings between the physical functions and associated virtual functions for SR-IOV compliant devices. In example embodiments, the configuration file 626 also stores status information regarding each physical I/O device, physical function, and virtual function, for example to determine whether each is active, functional, or in an error state. In example embodiments, the configuration file 626 is representative of contents of the I/O configuration space 617, but are stored such that software systems that do not require access rights to privileged memory can access and modify the file. Modifications to the configuration file 626 are then monitored and propagated to the I/O configuration space 617 by the trusted code base 608.

In some embodiments, the trusted code base 608 and/or SR-PCIM 620 implements a Translation Agent (TA), which corresponds to a combination of hardware and software responsible for translating an address within a PCIe transaction into the associated platform physical address. A TA may contain an Address Translation Cache (ATC) to accelerate translation table access. A TA may also support the PCI-SIG Address Translation Services Specification which enables a PCIe function to obtain address translations a priori to DMA access to the associated memory.

Figure 7:
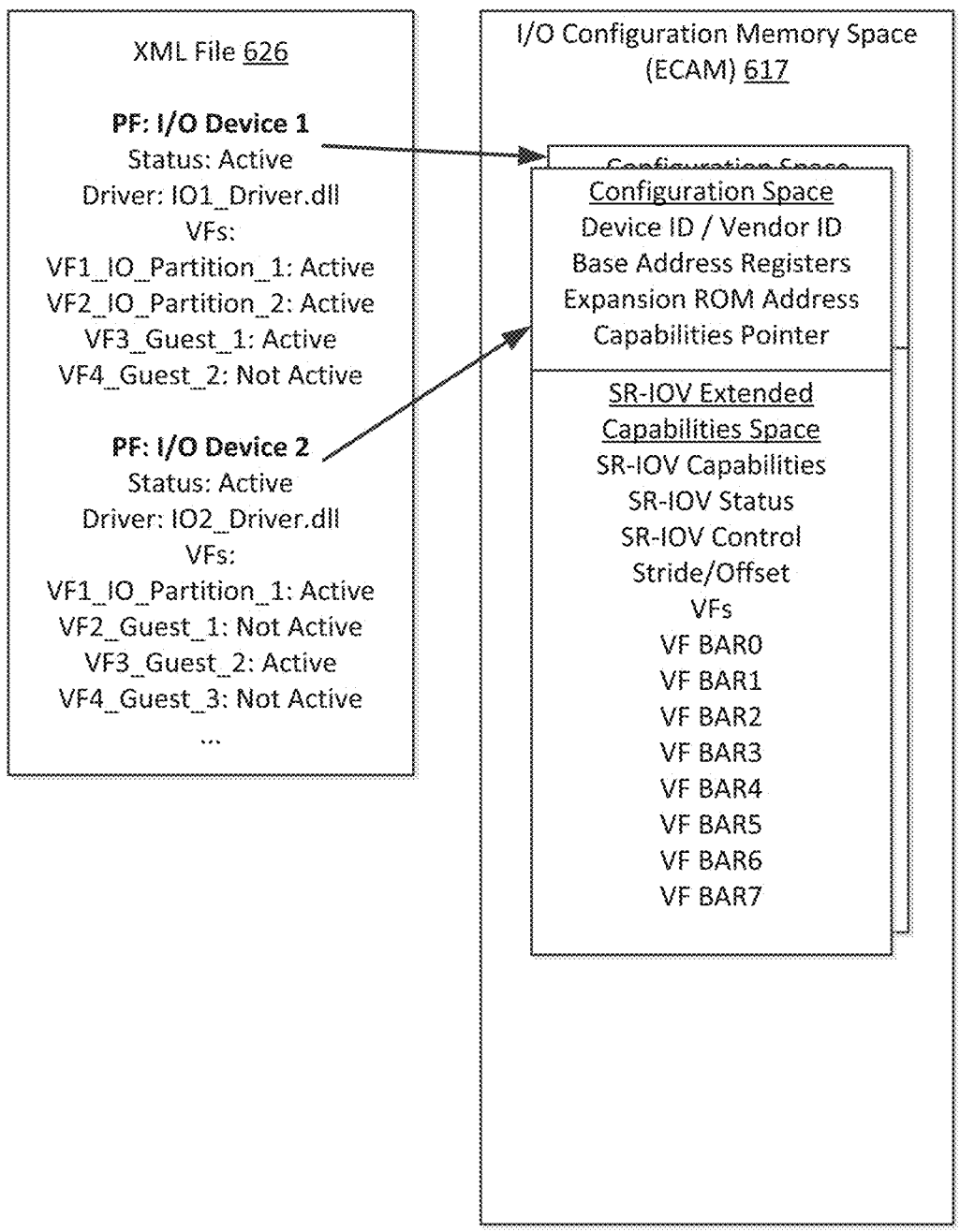
FIG. 7 illustrates an example markup language file useable to track SR-IOV device mappings and status within a partition lacking access to privileged memory, according to an example embodiment.

Referring to FIG. 7, an example correspondence between a configuration file 626 and an I/O configuration space 617 is shown. In the example shown, an XML file includes a plurality of device entries. The device entries each are associated with a different I/O device having a separate configuration memory space in the I/O configuration space 617. For example, a first entry, associated with a first I/O device, may correspond to a first physical function configuration space for that same I/O device, while a second entry in the XML file 626 may be associated with a second physical function configuration space, and so on.

As shown in FIG. 7, each of the device entries is associated with an I/O device, and as such is associated with a device driver used by system software to access and address the device. The device entries of the XML file 626 includes a status (e.g., active, inactive, error states), as well as a plurality of defined mappings to virtual functions. Each of the plurality of virtual functions can be assigned to different partitions and can also have a status associated therewith. For example, although a physical function may be active, a partition associated with one of the virtual functions may be in the process of rebooting, so that virtual function may be inactive. Other permutations on status of the physical and virtual functions are possible as well.

It is noted that, for each of the entries in the XML file 626, corresponding data is available in the I/O configuration space 617 (also known as ECAM memory in some embodiments). In example embodiments, a configuration space for a particular I/O device may include a device ID and vendor ID, base address registers, expansion ROM addresses, a capabilities pointer, as well as an SR-IOV extended capabilities space. The SR-IOV extended capabilities space can include, for example, SR-IOV capabilities data, as well as a status memory area, control bits, stride/offset data, as well as virtual function mappings via VFBAR memory areas that define a mapping of (in this case) up to eight virtual functions for each physical function. Details regarding the I/O configuration space 617 are provided in the Single Root I/O Virtualization and Sharing Specification, Revision 1.1, dated Jan. 20, 2010, the contents of which were previously incorporated, by reference in their entirety.

Figure 8:
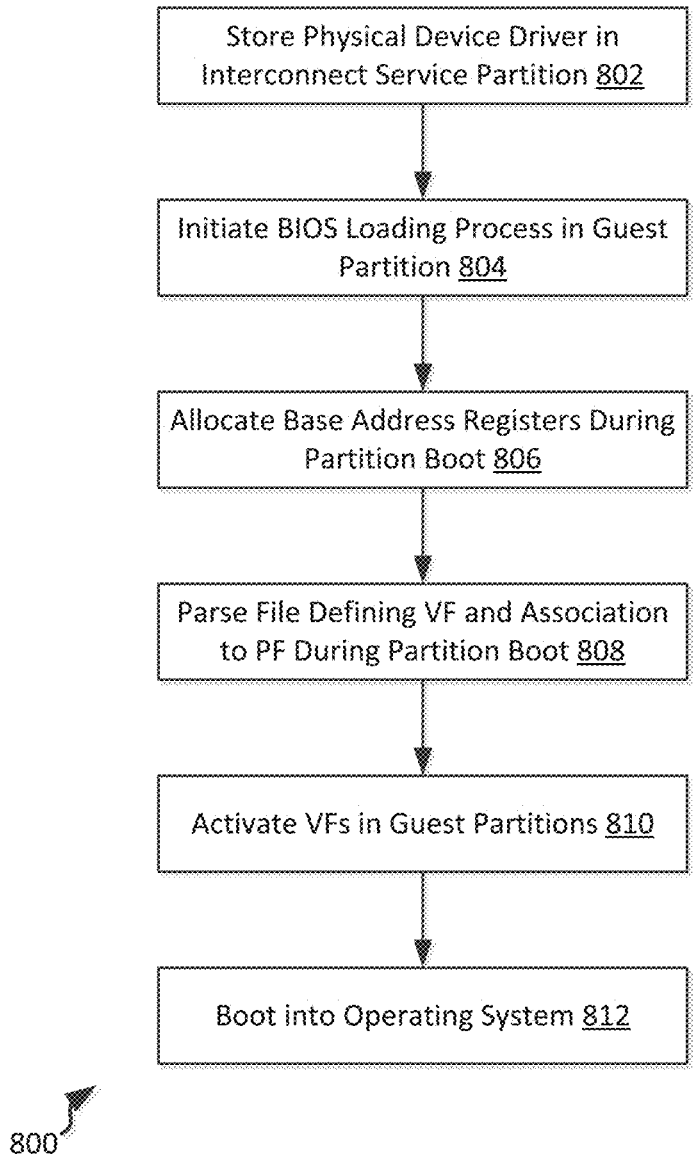
FIG. 8 illustrates a flowchart of a method of managing physical and virtual functions of an I/O device according to an example embodiment.

Referring now to FIG. 8, an example flowchart of a method 800 by which an SR-IOV device can be instantiated within a multi-partition framework such as that shown in connection with FIGS. 1-3 and 6 is provided. Aspects of the method 800 can be performed, for example, by a virtualization system, such as an interconnect service partition and/or a guest or I/O service partition, depending on the implementation and intended mapping of virtual functions within the multi-partition framework.

In the example shown, the method 800 includes a physical function operation 802 that operates to store a physical function driver in an interconnect service partition. The physical function operation 802 can be performed by a SR-IOM in the interconnect service partition, and can include loading of a physical function driver.

A guest partition initiation operation 804 includes a BIOS loading process that is initiated in the guest partition that will be associated with one of the virtual functions. During this BIOS loading process, base address registers are allocated during a partition boot, in operation 806. A parse operation 808 can include the SR-IOM of the interconnect service partition reading a file (e.g., XML file 626) defining the configuration information that is provided in the I/O configuration space (e.g., I/O configuration space 617) to determine mappings between the physical function and one or more virtual functions (including a virtual function to be mapped to the guest partition being booted.

Based on the SR-PCIM determining that the partition being booted is associated with one of the virtual functions for one or more devices, the SR-IOM will perform an activate operation 810 to activate the VFs for those guest partitions by writing to the XML file 626, which is propagated to the I/O configuration memory space by the trusted code block 808. Accordingly, the guest partition or I/O service partition can complete a boot operation 812, and boot into an operating system, thereby loading the virtual function associated with each device that is mapped for use by that partition in the I/O configuration space and XML file. Based on that loading process, the virtual function appears during the boot operation and can be accessed by the operating system, which views the virtual function equivalently to a physical I/O device.

Figure 9:
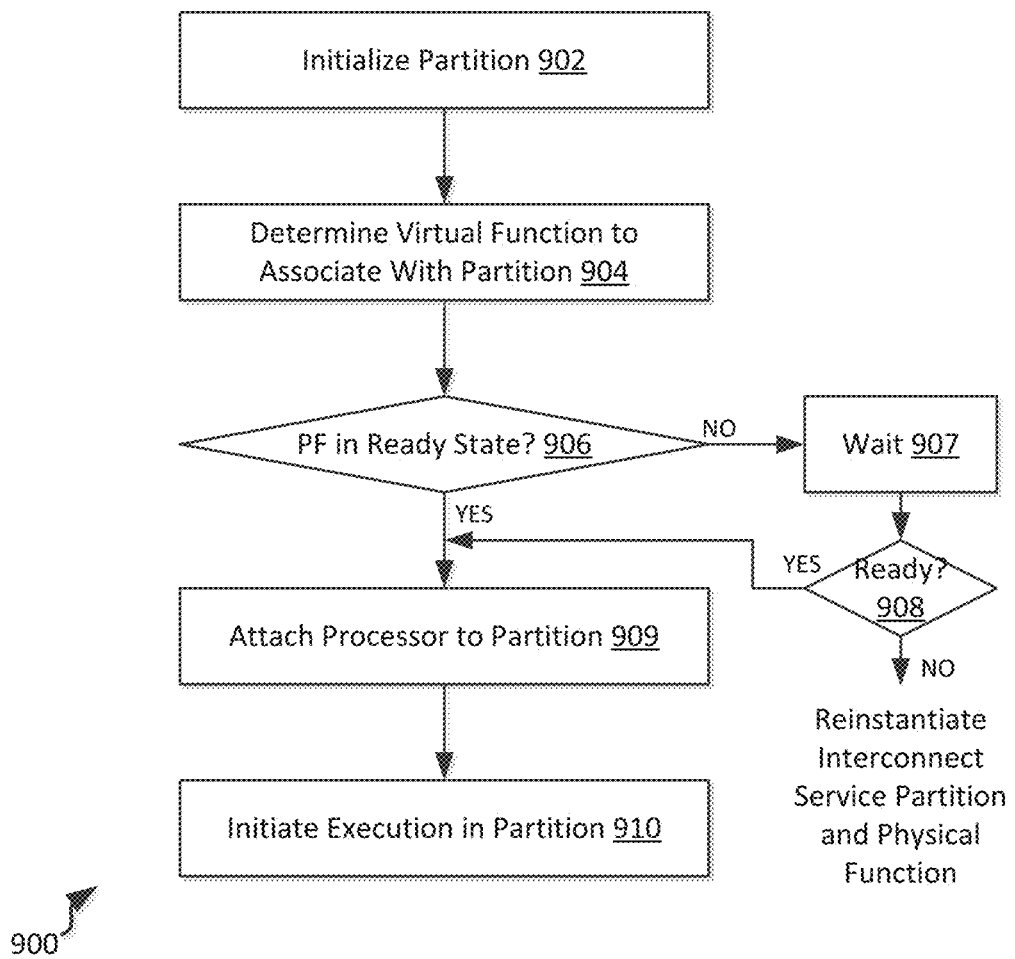
FIG. 9 illustrates a flowchart of a method of associating a virtual function of an I/O device to a partition, according to an example embodiment.

Referring to FIG. 9, an example method 900 for booting a guest or I/O service partition that is associated with a virtual function is illustrated. The method 900 can be performed, for example, concurrently with operations 804-808 performed by the SR-PCIM in the interconnect service partition.

In the example embodiment shown, the method 900 includes an initialization operation 902, which corresponds to initialization of the partition that is to be associated with one or more virtual functions. It is noted that, in example implementations of the present disclosure, such a partition to which a virtual function is to be assigned may have a variety of startup states. Such states can include, for example, an Enabled state, an Active state, an Alive state, a ChannelsAssigned state, a ProcessorAssigned state, a MemoryAssigned state, a ProcessorsAttached state, a ProcessorsScheduled state a ChannelsAttached state, a ChannelsScheduled state, a MemoryImage, ChannelImage, and ProcessorImage states, a ProcessorsOperating state, and a ChannelsOperating state, each indicating different operative states of various components of the system. It is noted that, in such cases, until processors are attached and scheduled for execution, the partition cannot initiate execution of workloads. In the context of the present disclosure, initialization can correspond to preparing the partition by assigning channels, processor(s), and memory to the partition, but not yet attaching or scheduling processors, thereby preventing initialization of operation until the virtual functions and associated physical function are verified as operational and associated with the partition.

After the partition is initialized, it is determined which virtual functions are to be associated with that partition, in operation 904. This can result in a determination that one or more virtual functions are to be associated with the partition, thereby appearing as I/O devices to the operating system hosted within that partition.

The method determines whether a physical function associated with the virtual function is in a ready state, based on assessment operation 906. This can correspond, for example, to an SR-PCIM within an interconnect service partition determining that, based on the contents of a file representing an I/O configuration memory space (e.g., XML file 626), a physical function associated with each of the virtual functions to be mapped to the partition to be initialized is active (e.g., in a "ready" state).

If the physical function is not in a ready state, the method 900 may enter a wait state 907 to allow the physical function to enter a ready state, for example in the case that the interconnect service partition is concurrently being initialized or the SR-PCIM had to re-initialize the physical function recently. In example embodiments, the wait state 607 can be accomplished by looping on an attaching processor state (e.g., prior to ProcessorsAttached in the above set of states), thereby preventing the guest partition that is to be allocated a virtual function from running (since no processor is attached and associated with that guest partition). After the wait state 907, a further assessment operation 908 determines whether the physical function is in a ready state, based on a device descriptor associated with that physical function. If, after waiting a predetermined amount of time, the physical function is not in the ready state, one or more actions may be taken. For example, in one example embodiment, the SR-PCIM in the interconnect service partition may attempt to restart the physical function or reinstate the physical function driver. In another example embodiment, the interconnect service partition can restart the SR-PCIM, which may result in a re-reading of the XML file, which may be updated based on changed I/O configuration data (e.g., in the I/O configuration space 617, such as ECAM memory). In a further example embodiment, the interconnect service partition in which the SR-PCIM and physical function driver can be restarted altogether, which will result in re-initialization of the physical function, as well as reloading of the physical function driver and SR-PCIM. This can include setting an UltraDeviceDescriptor for the physical function.

If the physical function is in a ready state after the wait state 907, or if the physical function is in a ready state initially, the method continues to a processor attach operation 910, which attaches a processor to the partition. It is noted that, although the physical function may be ready, the interconnect service partition may still be booting through other states (as noted above); however, the guest partition that is loading a virtual function associated with the ready physical function need not wait for the interconnect service partition to complete booting before proceeding. Accordingly, by associating a processor with the partition that is being initialized, the partition can initialize execution. Accordingly, an initiate execution operation 912 initiates booting of the partition through its BIOS and into its operating system, loading: all virtual functions that are verified as available and associated with ready physical functions and physical function drivers.

Referring generally to FIGS. 8-9 it is apparent from these arrangements that, rather than taking an OS-specific view of allocation and assignment of virtual functions to partitions, the present disclosure contemplates managing such features from the SR-PCIM and in a dedicated partition, such as the interconnect service partition as described. This allows the presently described systems to allocate all virtual functions and associated memory in the I/O configuration space 617 prior to configuration of the virtual functions as associated with partitions themselves. This allows for dynamic addition or removal of virtual functions to/from the XML file 626, and thereby allowing the SR-PCIM to dynamically change mappings of physical and virtual functions within the virtualization system.

Figure 10A:
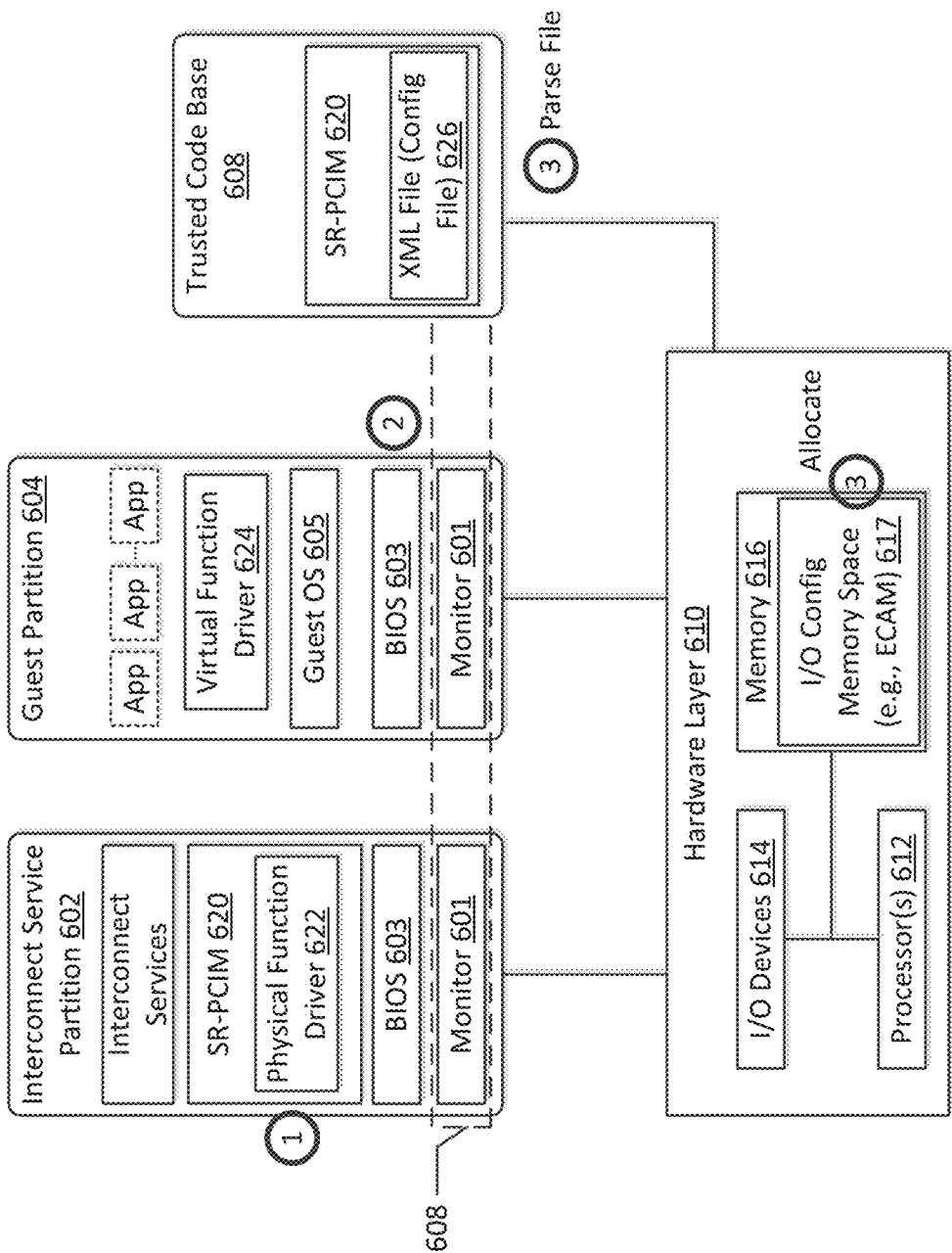
FIGS. 10A-10B illustrate processes by which physical and virtual functions can be managed in the example multi-partition system of FIG. 6.
Figure 10B:
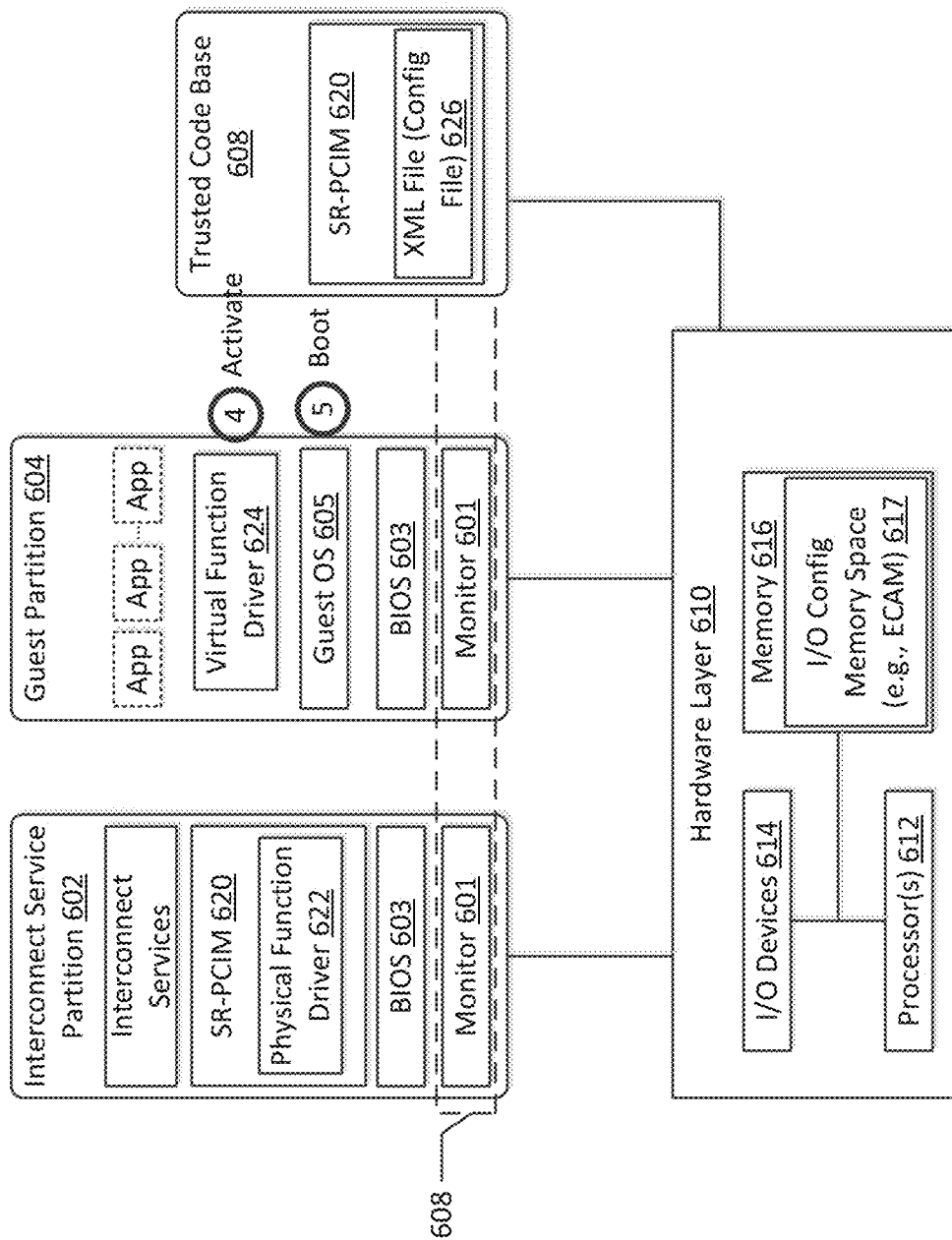

FIGS. 10A-10B illustrate an example arrangement by which a guest or I/O service partition can be initialized within the context of the multi-partition environment 600 of FIG. 6, for example using the methods and systems of FIGS. 8-9 described above. In the example shown, a physical function driver 622 is loaded by SR-TOM 620, for example during physical function operation 802 of FIG. 8. Subsequent to the physical function driver 622 being loaded and active, a guest partition 604 or I/O service partition 606 (shown as guest partition 604) is initialized, for example by initiating a BIOS loading process as in operation 804 of FIG. 8. Base address registers are allocated, and a file (e.g., XML file 626) is parsed to determine an association between a virtual function 624 to be loaded by the partition being initialized and a physical function and physical function driver 622 that is currently associated with an I/O device 614.

Once the correspondence between the virtual function and physical function is determined (e.g., as performed in operation 904 of FIG. 9) and assuming that the physical function is in the ready state, as shown in FIG. 10B, the virtual function driver 624 is activated within the guest partition 604, and a processor 614 is attached to the guest partition, allowing the guest partition to boot into the guest operating system 605.

Figure 11:
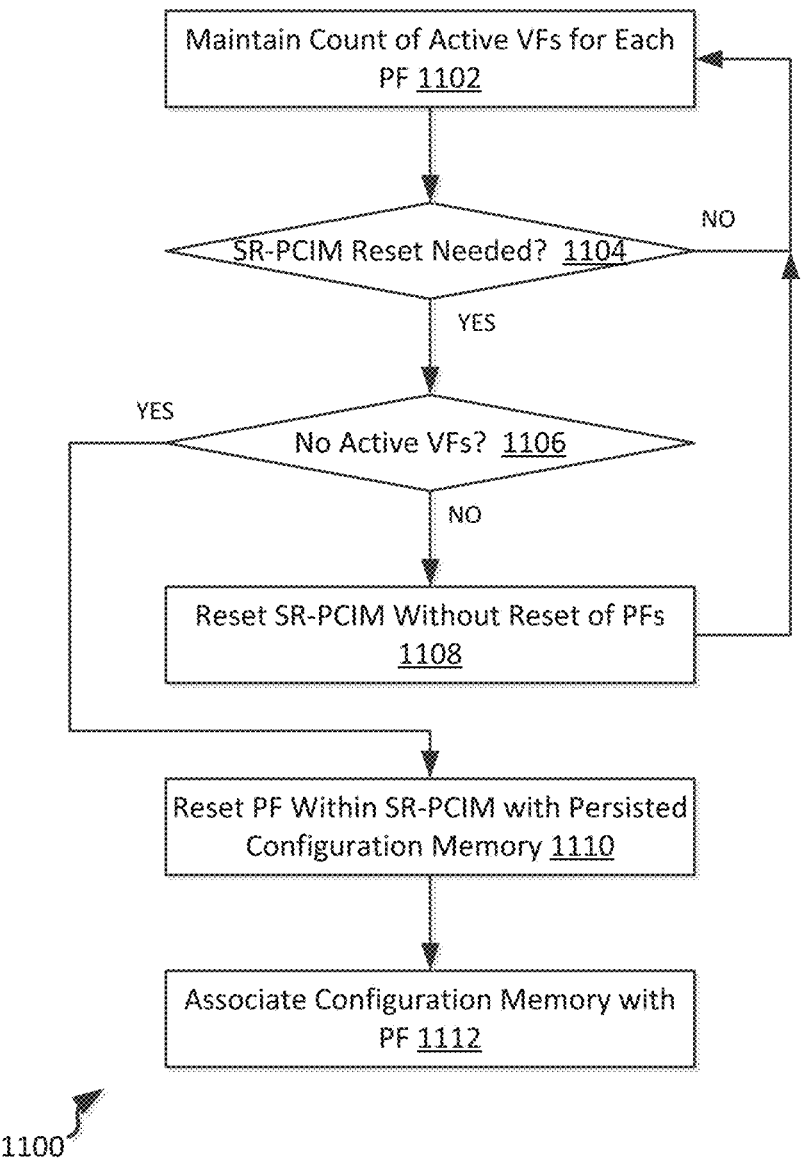
FIG. 11 illustrates an example method of managing a physical function and single root I/O manager in a partition of a multi-partition system, according to an example embodiment.

Referring now to FIG. 11, a method 1100 of managing a physical function and single root PCI manager (SR-PCIM) in a partition of a multi-partition system is shown, according to an example embodiment. The method 1100 can be performed, for example, by an interconnect service partition (e.g., partition 602) to manage a physical function and/or SR-PCIM that manages physical functions associated with I/O devices. In connection with method 1100, it is noted that the physical function associated with a particular I/O device need not be reset when a SR-PCIM is reset; as such, a guest partition may still be able to function and use its associated virtual functions despite the SR-PCIM being inoperable for at least some period of time.

In the embodiment shown, the method 1100 includes a count operation 1102 that maintains a count of active virtual functions for each physical function. The count operation 1102 can correspond, for example to periodically reading a file, such as XML file 626, defining each of the SR-IOV device mappings, and which is maintained by the trusted code block 608. The method 1100 determines whether an SR-IOM reset is needed, at operation 1104. This can be for a variety of reasons. For example, the SR-IOM may need to be reset to re-load a different physical function driver, or in the event of malfunction of either the SR-IOM or a physical function driver associated with an I/O device managed by the SR-IOM.

If no reset is required, the method 1100 simply returns to maintaining a count of active virtual functions for each physical function in the count operation. However, if a SR-PCIM reset is required, an active virtual function determination operation 1106 determines whether any active virtual functions are associated with any of the physical functions managed by the SR-PCIM. If there are active virtual functions that are associated with any of the physical functions being managed by the SR-PCIM, a reset operation 1108 can be performed in which the SR-PCIM is reset without resetting the physical functions, or at least those physical functions that are associated with active virtual functions as determined in operation 1106.

If it is determined that there are no active virtual functions associated with any of the physical functions managed by the SR-PCIM, a reset operation 1110 is performed, which resets each of the physical functions within the SR-PCIM as well as the SR-PCIM itself, while maintaining persisted configuration memory. In other words, in the case of the arrangement 600 of FIG. 6, the SR-PCIM 620 and physical functions maintained in the interconnect service partition 602 can be reset without causing the trusted code block 608 to alter either the XML file 626 or to alter the I/O configuration space 617 in memory 616. When restarted, an association operation associates the maintained I/O configuration space 617 with the associated physical function.

Referring to FIG. 11 generally, it is noted that, in typical implementations of SR-IOV systems, because the SR-PCIM is configured for direct access of ECAM memory (e.g., the I/O configuration space 617), in such embodiments resetting the SR-PCIM will cause release of the ECAM memory, rather than preserving such settings between physical and virtual functions. Accordingly, a reset of a physical function may in such cases require reset of each of the associated virtual functions. Furthermore, in typical implementations, the physical function is reset when the SR-PCIM is reset. According to the embodiments described herein, such resetting need not occur.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A method of allocating one or more virtual functions of a plurality of virtual functions associated with physical functions of I/O interface devices of a computing device, the method comprising:

managing one or more physical functions of an I/O interface device within an interconnect partition of a multi-partition virtualization system implemented at least in part on the computing device; and during a boot process of a second partition on the computing device, parsing a file to determine an assignment of one or more virtual functions to the second partition and associate each of the one or more virtual functions to corresponding physical functions, wherein the file comprises an XML file defining associations between at least one physical function and a plurality of virtual functions;

based on a change to the XML file adding a new virtual function associated with one of the physical functions, re-setting a value in an ECAM configuration space identifying a number of virtual functions associated with the physical function, wherein re-setting the value is performed by a trusted code base executing on the computing system.

2. The method of claim 1, wherein the each of the one or more virtual functions is activated and associated with the second partition prior to booting into an operating system hosted within the guest partition.

3. The method of claim 1, further comprising storing a physical function device driver in the interconnect service partition.

4. The method of claim 3, wherein storing the physical function device driver in the interconnect service partition includes storing the physical function device driver in a single root PCI manager of the interconnect service partition.

5. The method of claim 1, wherein the second partition comprises a guest partition.

6. The method of claim 1, wherein the second partition comprises an I/O service partition.

7. The method of claim 1, wherein the trusted code base is separate from the interconnect service partition.

8. The method of claim 7, further comprising reading the value directly from ECAM configuration space by a physical function device driver included in the interconnect service partition.

9. A computer program product of allocating one or more virtual functions of a plurality of virtual functions associated with physical functions of I/O interface devices of a computing device, comprising:

a non-transitory computer-readable medium comprising instructions which, when executed by a processor of a computing system, cause the processor to perform the steps of:

managing one or more physical functions of an I/O interface device within an interconnect partition of a multi-partition virtualization system implemented at least in part on the computing device; and during a boot process of a second partition on the computing device, parsing a file to determine an assignment of one or more virtual functions to the second partition and associate each of the one or more virtual functions to corresponding physical functions, wherein the file comprises an XML file defining associations between at least one physical function and a plurality of virtual functions;

based on a change to the XML file adding a new virtual function associated with a one of the physical functions, re-setting a value in an ECAM configuration space identifying a number of virtual functions associated with the physical function, wherein re-setting the value is performed by a trusted code base executing on the computing system.

10. The computer program product of claim 9, wherein the each of the one or more virtual functions is activated and associated with the second partition prior to booting into an operating system hosted within the guest partition.

11. The computer program product of claim 9, further comprising storing a physical function device driver in the interconnect service partition.

12. The computer program product of claim 11, wherein storing the physical function device driver in the interconnect service partition includes storing the physical function device driver in a single root PCI manager of the interconnect service partition.

13. The computer program product of claim 2, wherein the second partition comprises a guest partition.

14. The computer program product of claim 9, wherein the second partition comprises an I/O service partition.

15. The computer program product of claim 9, wherein the trusted code base is separate from the interconnect service partition.

16. The computer program product of claim 15, further comprising reading the value directly from ECAM configuration space by a physical function device driver included in the interconnect service partition.

17. An apparatus of allocating one or more virtual functions of a plurality of virtual functions associated with physical functions of I/O interface devices of a computing device, comprising:
    a memory; and
    a processor coupled to the memory, the processor configured to execute the steps of:
        managing one or more physical functions of an I/O interface device within an interconnect partition of a multi-partition virtualization system implemented at least in part on the computing device; and
        during a boot process of a second partition on the computing device, parsing a file to determine an assignment of one or more virtual functions to the second partition and associate each of the one or more virtual functions to corresponding physical functions, wherein the file comprises an XML file defining associations between at least one physical function and a plurality of virtual functions;
    based on a change to the XML file adding a new virtual function associated with a one of the physical functions, re-setting a value in an ECAM configuration space identifying a number of virtual functions associated with the physical function, wherein re-setting the value is performed by a trusted code base executing on the computing system.

18. The apparatus of claim 17, wherein the each of the one or more virtual functions is activated and associated with the second partition prior to booting into an operating system hosted within the guest partition.

19. The apparatus of claim 17, further comprising storing a physical function device driver in the interconnect service partition.

20. The apparatus of claim 19, wherein storing the physical function device driver in the interconnect service partition includes storing the physical function device driver in a single root PCI manager of the interconnect service partition.

21. The apparatus of claim 17, wherein the second partition comprises a guest partition.

22. The apparatus of claim 17, wherein the second partition comprises an I/O service partition.

23. The apparatus of claim 17, wherein the trusted code base is separate from the interconnect service partition.

24. The apparatus of claim 23, further comprising reading the value directly from ECAM configuration space by a physical function device driver included in the interconnect service partition.

* * * * *